(12) United States Patent
Kumamoto et al.

(10) Patent No.: US 10,618,310 B2
(45) Date of Patent: Apr. 14, 2020

(54) INK JET RECORDING INK SET AND INK JET RECORDING METHOD

(71) Applicant: Seiko Epson Corporation, Tokyo (JP)

(72) Inventors: Kiyomi Kumamoto, Shiojiri (JP); Shintaro Hama, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/037,034

(22) Filed: Jul. 17, 2018

(65) Prior Publication Data

US 2019/0023926 A1 Jan. 24, 2019

(30) Foreign Application Priority Data

Jul. 18, 2017 (JP) .................. 2017-138797

(51) Int. Cl.
 *B41J 2/21* (2006.01)
 *C09D 11/40* (2014.01)
 (Continued)

(52) U.S. Cl.
 CPC .......... *B41J 2/2107* (2013.01); *B41M 5/0023* (2013.01); *C09D 11/322* (2013.01);
 (Continued)

(58) Field of Classification Search
 CPC ........ B41J 2/1433; B41J 2/161; B41J 2/1623; B41J 2202/00; B41J 2202/03; B41J 2/14201; B41J 2/045; B41J 2/01; B41J 2/211; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; C09D 11/36; C09D 11/40; C09D 11/30; C09D 11/38;
 (Continued)

(56) References Cited

U.S. PATENT DOCUMENTS

2005/0041082 A1* 2/2005 Kataoka ............... C09D 11/40
 347/100
2005/0279246 A1 12/2005 Ohira et al.
 (Continued)

FOREIGN PATENT DOCUMENTS

JP 2006-002094 A 1/2006
JP 2013-010825 A 1/2013

*Primary Examiner* — Manish S Shah
(74) *Attorney, Agent, or Firm* — Harness, Dickey & Pierce, P.L.C.

(57) ABSTRACT

An ink jet recording ink set of this invention is an ink jet recording ink set containing a dye ink and a pigment ink, in which the dye ink contains a dye in a proportion of 1.4% by mass or more and 5.0% by mass or less based on the total mass of the ink, the pigment ink contains a pigment in a proportion of 4.0% by mass or more and 8.0% by mass or less based on the total mass of the ink, and, when the volume average particle diameter of the pigment ink is defined as $\Phi 1$ and the volume average particle diameter of a mixed liquid in which the dye ink and the pigment ink are mixed in equal amounts in terms of the mass ratio is defined as $\Phi 2$, the following expression (1) is satisfied, $$1.00 \leq \Phi 2/\Phi 1 \leq 1.40 \qquad (1).$$

10 Claims, 1 Drawing Sheet

(51) Int. Cl.
*B41M 5/00* (2006.01)
*C09D 11/322* (2014.01)
*C09D 11/324* (2014.01)
*C09D 11/328* (2014.01)

(52) U.S. Cl.
CPC .......... *C09D 11/324* (2013.01); *C09D 11/328* (2013.01); *C09D 11/40* (2013.01)

(58) Field of Classification Search
CPC ..... C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| | | | |
|---|---|---|---|
| 2010/0021633 A1* | 1/2010 | Udagawa | C09D 11/322 427/256 |
| 2013/0002757 A1* | 1/2013 | Aruga | C09D 11/322 347/33 |

* cited by examiner

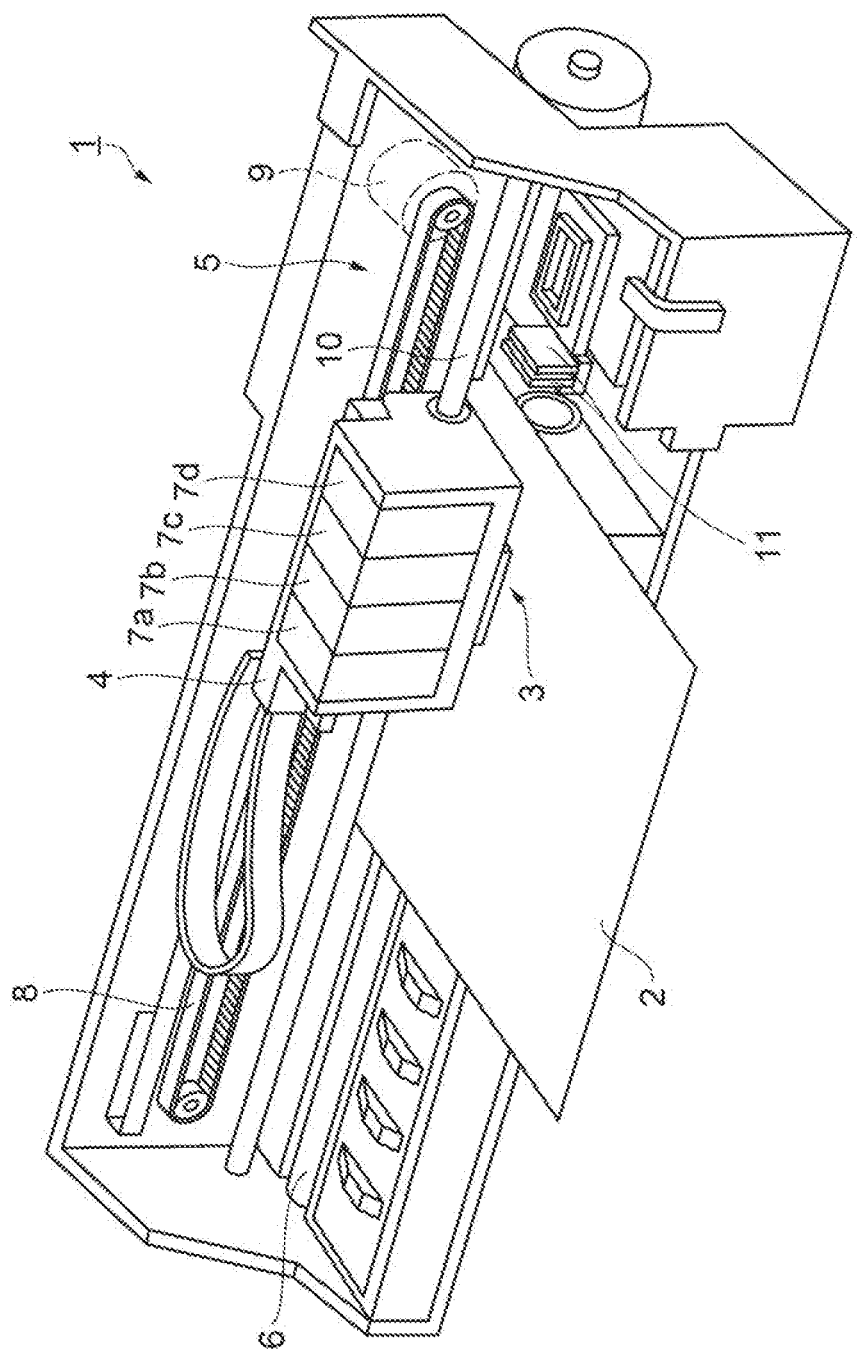

INK JET RECORDING INK SET AND INK JET RECORDING METHOD

BACKGROUND

1. Technical Field

The present invention relates to an ink jet recording ink set and an ink jet recording method.

2. Related Art

The ink jet recording method is a printing method including discharging ink liquid droplets from a discharge nozzle of the ink jet recording apparatus, and then causing the ink liquid droplets to adhere to recording media, such as paper, to produce printed matter. For color printing in the ink jet recording method, an ink set provided with inks of a plurality of colors containing dyes or pigments as coloring materials is used. A dye ink containing dyes is excellent in color developability and the like of printed matter. A pigment ink containing pigments is excellent in water resistance, lightfastness, and the like of printed matter. Heretofore, in order to utilize the features of both such dye ink and pigment ink, an ink jet recording ink set containing the dye ink and the pigment ink has been known.

However, when the dye ink and the pigment ink are mixed on a discharge nozzle, a nozzle plate, a wiper, and the like, components, such as pigments, in the pigment ink are likely to aggregate to generate an aggregate under the influence originating from the dyes of the dye ink, and then the aggregate is mixed into the discharge nozzle or adheres to the vicinity of the discharge nozzle, which has contributed to discharge failures, such as the omission of dots and curving, in some cases. Then, various examinations have been made in order to suppress the generation of the aggregate. For example, JP-A-2013-10825 has supposed an ink set in which the limiting equivalent conductivity of counter ions of the dyes contained in the dye ink and the limiting equivalent conductivity of counter ions of the pigment contained in the pigment ink are specified. Moreover, for example, JP-A-2004-2094 has suggested an ink jet recording ink set which has a pigment ink containing a negatively charged self-dispersible pigment and a dye ink containing an anionic dye and in which the amounts of counter ions of the self-dispersible pigment and the anionic dye are specified.

However, the ink jet recording ink sets described in JP-A-2013-10825 and JP-A-2004-2094 has had a problem that the ink jet recording ink sets have been hard to improve the discharge stability in printing and the color developability of printed matter. In detail, ink jet recording ink sets have been demanded to increase the printing speed and increase the definition of printed matter in recent years. Accordingly, ink liquid droplets are miniaturized and discharged at a high speed, and therefore it is necessary to further suppress the generation of an aggregate in a discharge nozzle and the like in order to further suppress influence on the miniaturized liquid droplets. On the other hand, in the former techniques in which the counter ions of coloring materials are specified, the effect of suppressing the generation of an aggregate has been insufficient in some cases, so that there has been a possibility that it has become hard to secure discharge stability in some cases.

Moreover, since the limiting equivalent conductivity and the ion content of counter ions of coloring materials have been specified, the composition of an ink has been likely to be limited, so that it has been hard to improve the discharge stability in high speed printing. Moreover, the kind of the coloring materials has also been likely to be limited, and therefore it has also become hard to secure color developability and it has also been hard to cope with the increase in definition. Furthermore, when the content of the coloring materials contained in the ink has been increased, an aggregate has been likely to generate and it has also been hard to improve the color developability of printed matter due to the increase in the amount of the coloring materials. More specifically, an ink jet recording ink set containing a dye ink and a pigment ink in which the discharge stability and the color developability are improved corresponding to the high speed printing and the increase in definition in recent years has been demanded.

SUMMARY

The invention has been made in order to at least partially solve the above-described problems and can be realized as the following aspects or application examples.

APPLICATION EXAMPLE

An ink jet recording ink set according to this application example is an ink jet recording ink set containing a dye ink and a pigment ink, in which the dye ink contains a dye in a proportion of 1.4% by mass or more and 5.0% by mass or less based on the total mass of the ink, the pigment ink contains a pigment in a proportion of 4.0% by mass or more and 8.0% by mass or less based on the total mass of the ink, and, when the volume average particle diameter of the pigment ink is defined as $\Phi 1$ and the volume average particle diameter of a mixed liquid in which the dye ink and the pigment ink are mixed in equal amounts in terms of the mass ratio is defined as $\Phi 2$, the following expression (1) is satisfied, $$1.00 \leq \Phi 2/\Phi 1 \leq 1.40 \tag{1}$$

According to this application example, even when the dye ink and the pigment ink are mixed, an increase in the volume average particle diameter of particles of the pigment or the like is suppressed and the discharge stability can be improved as compared with before. In detail, the volume average particle diameter $\Phi 2$ of the mixed liquid of the dye ink and the pigment ink is 1 times or more and 1.4 times or less the volume average particle diameter $\Phi 1$ of the pigment ink. Therefore, even when the mixing of the dye ink and the pigment ink occurs, the increase in the volume average particle diameter of particles of the pigment or the like is suppressed. More specifically, as compared with the particles of the pigment or the like contained in the pigment ink, the generation of an aggregate in which the volume average particle diameter exceeds 1.4 times is suppressed. Therefore, an aggregate is further reduced as compared with before, and, even when minute ink liquid droplets are discharged at a high speed, discharge failures are hard to occur as compared with before, so that the discharge stability can be improved.

Moreover, since the generation of a coarse aggregate is suppressed, it becomes possible to increase the content of the coloring material (dye and pigment) in the ink. Therefore, the color developability of printed matter can be increased as compared with before. As described above, an ink jet recording ink set containing a dye ink and a pigment ink in which the discharge stability and the color developability are improved corresponding to the recent high speed printing and increase in definition can be provided.

In the ink jet recording ink set described in the application example above, the absorbance at the maximum absorption wavelength when diluted with water by 1000 times of the dye is preferably 3.0 or more.

Thus, the color developability by the dye ink can be further improved.

In the ink jet recording ink set described in the application example above, the maximum absorption wavelength of the dye is preferably within the range of 500 nm or more and 560 nm or less.

Thus, a magenta dye ink in which the color developability is improved and the generation of an aggregate is suppressed can be used.

In the ink jet recording ink set described in the application example above, the dye ink preferably contains a compound represented by General Formula (1) as the dye,

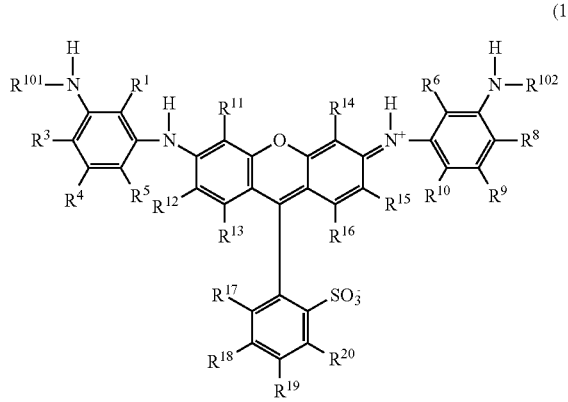

(1)

in which, in General Formula (1), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ are each independently a hydrogen atom or a substituent, $R^{101}$ and $R^{102}$ are each independently a substituted or unsubstituted alkyl group, a substituted or unsubstituted aryl group, a substituted or unsubstituted heterocyclic group, a substituted or unsubstituted alkylsulfonyl group, a substituted or unsubstituted arylsulfonyl group, a substituted or unsubstituted alkoxycarbonyl group, a substituted or unsubstituted aryloxycarbonyl group, a carbamoyl group, a substituted or unsubstituted monoalkyl aminocarbonyl group, a substituted or unsubstituted dialkyl aminocarbonyl group, a substituted or unsubstituted monoaryl aminocarbonyl group, a substituted or unsubstituted diaryl aminocarbonyl group, or a substituted or unsubstituted alkyl aryl aminocarbonyl group.

Thus, even when mixed with the pigment ink, the generation of an aggregate is further suppressed and the color developability of printed matter is further improved. Furthermore, the ozone resistance of printed matter can be improved.

In the ink jet recording ink set described in the application example above, $R^1$, $R^3$, $R^5$, $R^6$, $R^8$, and $R^{10}$ in the compound represented by General Formula (1) are each independently preferably an alkyl group having 1 or more and 6 or less carbon atoms.

Thus, in the compound represented by General Formula (1), the ease of availability and synthesis of raw materials can be improved.

In the ink jet recording ink set described in the application example above, the pigment ink preferably contains a self-dispersible black pigment as the pigment.

Thus, a black pigment ink is used as the pigment ink, and therefore the water resistance and the lightfastness of black printing in printed matter can be improved. Moreover, the black pigment is a self-dispersion type (self-dispersible), and therefore a dispersant becomes unnecessary in the black pigment ink. Therefore, the generation of an aggregate and an increase in ink viscosity originating from a dispersant can be suppressed.

APPLICATION EXAMPLE

An ink jet recording method according to this application example includes a process of causing the ink jet recording ink sets according to the application examples above to adhere to a recording medium.

According to this application example, high speed printing is enabled, and therefore the time required for producing printed matter can be shortened. Moreover, the discharge stability is improved, and therefore the process of causing the ink jet recording ink set to adhere to a recording medium can be stably performed. Therefore, an ink jet recording method capable of stably producing a high definition printed matter at a high speed as compared with before can be provided.

BRIEF DESCRIPTION OF THE DRAWINGS

The invention will be described with reference to the accompanying drawing, wherein like numbers reference like elements.

FIGURE is a schematic perspective view illustrating an ink jet recording apparatus according to an embodiment.

DESCRIPTION OF EXEMPLARY EMBODIMENTS

Hereinafter, an embodiment of the invention is described. The embodiment described below describes an example of the invention. The invention is not limited to the following embodiment and can be altered as appropriate without deviating from the gist or the idea of the invention which can be read from the entire Claims and specification and ink jet recording ink sets and ink jet recording methods accompanied by such alternations are also included in the technical scope of the invention.

Ink Set

An ink jet recording ink set according to this embodiment is an ink jet recording ink set containing a dye ink and a pigment ink, in which the dye ink contains a dye in a proportion of 1.4% by mass or more and 5.0% by mass or less based on the total mass of the ink, the pigment ink contains a pigment in a proportion of 4.0% by mass or more and 8.0% by mass or less based on the total mass of the ink, and, when the volume average particle diameter of the pigment ink is defined as $\Phi 1$ and the volume average particle diameter of a mixed liquid in which the dye ink and the pigment ink are mixed in equal amounts in terms of the mass ratio is defined as $\Phi 2$, the following expression (1) is satisfied, $$1.00 \leq \Phi 2/\Phi 1 \leq 1.40 \tag{1}$$

In the ink jet recording ink set of this embodiment (hereinafter sometimes also simply referred to as "ink set"), two or more kinds of inks of a black ink, a cyan ink, a yellow ink, and a magenta ink are used in combination. The ink set may contain inks exhibiting colors other than the colors mentioned above. Hereinafter, the dye ink and the pigment ink contained in the ink set of this embodiment are described taking an aqueous ink containing water as the main medium (solvent) as an example.

Ink

The ink according to this embodiment contains a dye or a pigment as a coloring material, water, an organic solvent, a surfactant, and the like. Hereinafter, the above-described components contained in the ink are described.

Dye

Examples of dyes for a yellow dye ink include C.I. (Colour Index Generic Name) Direct Yellow 86, C.I. Direct Yellow 132, and the like, for example, and at least one kind thereof is preferably used. The yellow dye ink may contain dyes other than the dyes mentioned above insofar as the object of the invention can be achieved.

As dyes for a magenta dye ink, dyes having a maximum absorption wavelength within the range of 500 nm or more and 560 nm or less are used. Herein, the dyes for the magenta dye ink are described with reference to specific examples while defining substituents in the compounds represented by General Formula (1) described later as substituent groups.

Examples of the substituent groups include halogen atoms, alkyl groups, aralkyl groups, alkenyl groups, alkynyl groups, aryl groups, heterocyclic groups, cyano groups, hydroxyl groups, nitro groups, alkoxy groups, aryloxy groups, silyloxy groups, heterocyclicoxy groups, acyloxy groups, carbamoyloxy groups, alkoxycarbonyloxy groups, aryloxycarbonyloxy groups, amino groups, acylamino groups, aminocarbonylamino groups, alkoxycarbonylamino groups, aryloxy carbonylamino groups, sulfamoylamino groups, alkyl or aryl sulfonylamino groups, mercapto groups, alkylthio groups, arylthio groups, heterocyclicthio groups, sulfamoyl groups, alkyl or aryl sulfinyl groups, alkyl or aryl sulfonyl groups, acyl groups, aryloxycarbonyl groups, alkoxycarbonyl groups, carbamoyl groups, aryl or heterocyclic azo groups, imide groups, phosphino groups, phosphinyl groups, phosphinyloxy groups, phosphinylamino groups, silyl groups, and ionic hydrophilic groups. These substituents may be further substituted and the groups selected from the substituent groups can be mentioned as further substituents.

Examples of the halogen atoms include a fluorine atom, a chlorine atom, a bromine atom, or an iodine atom, for example.

Examples of the alkyl groups include linear, branched, or cyclic substituted or unsubstituted alkyl groups and also include cycloalkyl groups, bicycloalkyl groups, tricyclo structures having a large number of ring structures, and the like. Alkyl groups in the substituents described below (e.g., alkyl groups of alkoxy groups and alkylthio groups) also indicate the alkyl groups of such a concept.

As the alkyl groups, alkyl groups having 1 or more and 30 or less carbon atoms, e.g., methyl groups, ethyl groups, n-propyl groups, i-propyl groups, t-butyl groups, n-octyl groups, eicosyl groups, 2-chloroethyl groups, 2-cyanoethyl groups, and 2-ethyl hexyl groups, and the like are preferably mentioned. As the cycloalkyl groups, substituted or unsubstituted cycloalkyl groups having 3 or more and 30 or less carbon atoms, e.g., cyclohexyl groups, cyclopentyl groups, and a 4-n-dodecyl cyclohexyl group, and the like are preferably mentioned. As the bicycloalkyl groups, substituted or unsubstituted bicycloalkyl groups having 5 or more and 30 or less carbon atoms, i.e., monovalent groups in which one hydrogen atom is removed from bicycloalkanes having 5 or more and 30 or less carbon atoms, e.g., a bicyclo[1,2,2] heptane-2-yl group and a bicyclo[2,2,2]octane-3-yl group, and the like are preferably mentioned.

Examples of the aralkyl groups include substituted or unsubstituted aralkyl groups. As the substituted or unsubstituted aralkyl groups, aralkyl groups having 7 or more and 30 or less carbon atoms are preferable. For example, a benzyl group and a 2-phenethyl group are mentioned.

As the alkenyl groups, linear, branched, or cyclic substituted or unsubstituted alkenyl groups are mentioned and a cycloalkenyl group and a bicyclo alkenyl group are included.

As the alkenyl groups, substituted or unsubstituted alkenyl groups having 2 or more and 30 or less carbon atoms, e.g., a vinyl group, an allyl group, a prenyl group, a geranyl group, and an oleyl group, and the like are preferably mentioned. As the cycloalkenyl groups, substituted or unsubstituted cycloalkenyl groups having 3 or more and 30 or less carbon atoms, i.e., monovalent groups obtained by removing one hydrogen atom of cycloalkenes having 3 or more and 30 or less carbon atoms, e.g., a 2-cyclopentene-1-yl group and a 2-cyclohexene-1-yl group, and the like are preferably mentioned. As the bicycloalkenyl groups, substituted or unsubstituted bicycloalkenyl groups are mentioned and substituted or unsubstituted bicycloalkenyl groups having 5 or more and 30 or less carbon atoms, i.e., monovalent groups obtained by removing one hydrogen atom of bicycloalkenes having one double bond, e.g., a bicyclo[2,2,1]hepto-2-ene-1-yl group and a bicyclo[2,2,2]octo-2-ene-4-yl group, and the like are preferably mentioned.

As the alkynyl groups, substituted or unsubstituted alkynyl groups having 2 or more and 30 or less carbon atoms, e.g., an ethynyl group, a propargyl group, and a trimethylsilylethynyl group, and the like are preferably mentioned.

As the aryl groups, substituted or unsubstituted aryl groups having 6 or more and 30 or less carbon atoms, e.g., a phenyl group, a p-tolyl group, a naphthyl group, a m-chlorophenyl group, and an o-hexadecanoyl aminophenyl group, and the like are preferably mentioned.

As the heterocyclic groups, monovalent groups in which one hydrogen atom is removed from 5-membered or 6-membered substituted or unsubstituted aromatic or non-aromatic heterocyclic compounds are preferably mentioned and 5-membered or 6-membered aromatic heterocyclic groups having 3 or more and 30 or less carbon atoms, e.g., a 2-furyl group, a 2-thienyl group, a 2-pyrimidinyl group, and a 2-benzothiazolyl group, and the like are more preferably mentioned. Examples of non-aromatic heterocyclic groups include a morpholinyl group and the like.

As the alkoxy groups, substituted or unsubstituted alkoxy groups having 1 or more and 30 or less carbon atoms, e.g., a methoxy group, an ethoxy group, an isopropoxy group, a t-butoxy group, an n-octyloxy group, and a 2-methoxy ethoxy group, and the like are preferably mentioned.

As the aryloxy groups, substituted or unsubstituted aryloxy groups having 6 or more and 30 or less carbon atoms, e.g., a phenoxy group, a 2-methyl phenoxy group, a 4-t-butyl phenoxy group, a 3-nitrophenoxy group, and a 2-tetradecanoyl aminophenoxy group, and the like are preferably mentioned.

As the silyloxy groups, substituted or unsubstituted silyloxy groups having 0 or more and 20 or less carbon atoms, e.g., a trimethylsilyloxy group and a diphenyl methyl silyloxy group, and the like are preferably mentioned.

As the heterocyclicoxy groups, substituted or unsubstituted heterocyclicoxy groups having 2 or more and 30 or less carbon atoms, e.g., a 1-phenyltetrazole-5-oxy group, and a 2-tetrahydro pyranyloxy group, and the like are preferably mentioned.

As the acyloxy groups, a formyloxy group, substituted or unsubstituted alkyl carbonyloxy groups having 2 or more and 30 or less carbon atoms, substituted or unsubstituted aryl carbonyloxy groups having 6 or more and 30 or less carbon atoms, e.g., an acetyloxy group, a pivaloyloxy group, a stearoyloxy group, a benzoyloxy group, and a p-methoxy phenyl carbonyloxy group, and the like are preferably mentioned.

As the carbamoyloxy groups, substituted or unsubstituted carbamoyloxy groups having 1 or more and 30 or less carbon atoms, e.g., an N,N-dimethyl carbamoyloxy group, an N,N-diethylcarbamoyloxy group, a morpholino carbonyloxy group, an N,N-di-n-octylaminocarbonyloxy group, and an N-n-octylcarbamoyloxy group, and the like are preferably mentioned.

As the alkoxycarbonyloxy groups, substituted or unsubstituted alkoxycarbonyloxy groups having 2 or more and 30 or less carbon atoms, e.g., a methoxy carbonyloxy group, an ethoxy carbonyloxy group, a t-butoxy carbonyloxy group, and an n-octyl carbonyloxy group, and the like are preferably mentioned.

As the aryloxycarbonyloxy groups, substituted or unsubstituted aryloxycarbonyloxy groups having 7 or more and 30 or less carbon atoms, e.g., a phenoxy carbonyloxy group, a p-methoxy phenoxy carbonyloxy group, and a p-n-hexadecyloxy phenoxy carbonyloxy group, and the like are preferably mentioned.

As the amino groups, an alkylamino group, an arylamino group, and a heterocyclic amino group are included and amino groups, substituted or unsubstituted alkylamino groups having 1 or more and 30 or less carbon atoms, substituted or unsubstituted anilino groups having 6 or more and 30 or less carbon atoms, e.g., a methylamino group, a dimethylamino group, an anilino group, an N-methyl-anilino group, a diphenyl amino group, and a triazinylamino group, and the like are preferably mentioned.

As the acylamino groups, a formyl amino group, substituted or unsubstituted alkyl carbonylamino groups having 1 or more and 30 or less carbon atoms, substituted or unsubstituted aryl carbonylamino groups having 6 or more and or less carbon atoms, e.g., an acetyl amino group, a pivaloyl amino group, a lauroyl amino group, a benzoyl amino group, and a 3,4,5-tri-n-octyloxy phenyl carbonylamino group, and the like are preferably mentioned.

As the aminocarbonylamino groups, substituted or unsubstituted aminocarbonylamino groups having 1 or more and 30 or less carbon atoms, e.g., a carbamoylamino group, an N,N-dimethylaminocarbonylamino group, an N,N-diethylaminocarbonylamino group, and a morpholinocarbonylamino group, and the like preferably mentioned.

As the alkoxycarbonylamino groups, substituted or unsubstituted alkoxycarbonylamino groups having 2 or more and 30 or less carbon atoms, e.g., a methoxy carbonylamino group, an ethoxy carbonylamino group, a t-butoxy carbonylamino group, an n-octadecyloxy carbonylamino group, and an N-methyl-methoxy carbonylamino group, and the like are preferably mentioned.

As the aryloxycarbonylamino groups, substituted or unsubstituted aryloxycarbonylamino groups having 7 or more and 30 or less carbon atoms, e.g., a phenoxy carbonylamino group, a p-chlorophenoxy carbonylamino group, and a m-n-octyloxy phenoxy carbonylamino group, and the like are preferably mentioned.

As the sulfamoylamino groups, substituted or unsubstituted sulfamoylamino groups having 0 or more and 30 or less a carbon atoms, e.g., a sulfamoylamino group, an N,N-dimethylaminosulfonylamino group, and an N-n-octylaminosulfonylamino group, and the like are preferably mentioned.

As the alkyl or aryl sulfonylamino groups, substituted or unsubstituted alkylsulfonylamino groups having 1 or more and 30 or less carbon atoms, substituted or unsubstituted aryl sulfonylamino groups having 6 or more and 30 or less carbon atoms, e.g., a methyl sulfonylamino group, a butyl sulfonylamino group, a phenyl sulfonylamino group, a 2,3,5-trichlorophenyl sulfonylamino group, and a p-methyl phenyl sulfonyl amino group, and the like are preferably mentioned.

As the alkylthio group, substituted or unsubstituted alkylthio groups having 1 or more and 30 or less carbon atoms, e.g., a methylthio group, an ethylthio group, and an n-hexadecylthio group, and the like are preferably mentioned.

As the arylthio groups, substituted or unsubstituted arylthio groups having 6 or more and 30 or less carbon atoms, e.g., a phenylthio group, a p-chlorophenylthio group, and a m-methoxy phenylthio group, and the like are preferably mentioned.

As the heterocyclicthio groups, substituted or unsubstituted heterocyclicthio groups having 2 or more and 30 or less carbon atoms, e.g., a 2-benzothiazolylthio group and a 1-phenyltetrazole-5-ylthio group, and the like are preferably mentioned.

As the sulfamoyl groups, substituted or unsubstituted sulfamoyl groups having 0 or more and 30 or less carbon atoms, e.g., an N-ethyl sulfamoyl group, an N-(3-dodecyloxy propyl) sulfamoyl group, an N,N-dimethyl sulfamoyl group, an N-acetyl sulfamoyl group, an N-benzoyl sulfamoyl group, and an N—(N'-phenyl carbamoyl) sulfamoyl group, and the like are preferably mentioned.

As the alkyl or aryl sulfinyl groups, substituted or unsubstituted alkyl sulfinyl groups having 1 or more and 30 or less carbon atoms, substituted or unsubstituted aryl sulfinyl groups having 6 or more and 30 or less carbon atoms, e.g., a methyl sulfinyl group, an ethyl sulfinyl group, a phenyl sulfinyl group, and a p-methyl phenyl sulfinyl group, and the like are preferably mentioned.

As the alkyl or aryl sulfonyl groups, substituted or unsubstituted alkylsulfonyl groups having 1 or more and 30 or less carbon atoms, substituted or unsubstituted aryl sulfonyl groups having 6 or more and 30 or less carbon atoms, e.g., a methyl sulfonyl group, an ethyl sulfonyl group, a phenyl sulfonyl group, and a p-methyl phenyl sulfonyl group, and the like are preferably mentioned.

As the acyl groups, formyl groups, substituted or unsubstituted alkyl carbonyl groups having 2 or more and 30 or less carbon atoms, substituted or unsubstituted aryl carbonyl groups having 7 or more and 30 or less carbon atoms, substituted or unsubstituted heterocyclic carbonyl groups having 2 or more and 30 or less carbon atoms bonded to carbonyl groups through the carbon atoms, e.g., an acetyl group, a pivaloyl group, a 2-chloroacetyl group, a stearoyl group, a benzoyl group, a p-n-octyloxy phenyl carbonyl group, a 2-pyridyl carbonyl group, and 2-furyl carbonyl group, and the like are preferably mentioned.

As the aryloxycarbonyl groups, substituted or unsubstituted aryloxycarbonyl groups having 7 or more and 30 or less carbon atoms, e.g., a phenoxycarbonyl group, an o-chlorophenoxycarbonyl group, a m-nitrophenoxycarbonyl group, and a p-t-butyl phenoxycarbonyl group, and the like are preferably mentioned.

As the alkoxycarbonyl groups, substituted or unsubstituted alkoxycarbonyl groups having 2 or more and 30 or less carbon atoms, e.g., a methoxycarbonyl group, an ethoxycarbonyl group, a t-butoxy carbonyl group, and an n-octadecyloxy carbonyl group, and the like are preferably mentioned.

As the carbamoyl groups, substituted or unsubstituted carbamoyl groups having 1 or more and 30 or less carbon atoms, e.g., a carbamoyl group, an N-methyl carbamoyl group, an N,N-dimethyl carbamoyl group, an N,N-di-n-octyl carbamoyl group, and an N-(methyl sulfonyl) carbamoyl group, and the like are preferably mentioned.

As the aryl or heterocyclic azo groups, substituted or unsubstituted aryl azo groups having 6 or more and 30 or less carbon atoms, substituted or unsubstituted heterocyclic azo groups having 3 or more and 30 or less carbon atoms, e.g., a phenyl azo group, a p-chlorophenyl azo group, and a 5-ethylthio-1,3,4-thiadiazole-2-ylazo group, and the like are preferably mentioned.

As the imide groups, an N-succinimide group, an N-phthalimide group, and the like are preferably mentioned.

As the phosphino groups, substituted or unsubstituted phosphino groups having 0 or more and 30 or less carbon atoms, e.g., a dimethyl phosphino group, a diphenyl phosphino group, and a methyl phenoxy phosphino group, and the like are preferably mentioned.

As the phosphinyl groups, substituted or unsubstituted phosphinyl groups having 0 or more and 30 or less carbon atoms, e.g., a phosphinyl group, a dioctyloxyphosphinyl group, and a diethoxyphosphinyl group, and the like are preferably mentioned.

As the phosphinyloxy groups, substituted or unsubstituted phosphinyloxy groups having 0 or more and 30 or less carbon atoms, e.g., a diphenoxyphosphinyloxy group and a dioctyloxy phosphinyloxy group, and the like are preferably mentioned.

As the phosphinylamino groups, substituted or unsubstituted phosphinylamino groups having 0 or more and 30 or less carbon atoms, e.g., a dimethoxy phosphinyl amino group and a dimethylamino phosphinyl amino group, and the like are preferably mentioned.

As the silyl groups, substituted or unsubstituted silyl groups having 0 or more and 30 or less carbon atoms, e.g., a trimethylsilyl group, a t-butyldimethylsilyl group, and a phenyl dimethyl silyl group, and the like are preferably mentioned.

Examples of the ionic hydrophilic groups include a sulfo group, a carboxyl group, a thiocarboxyl group, a sulfino group, a phosphono group, a dihydroxyphosphino group, a quaternary ammonium group, and the like. The sulfo group and the carboxyl group are particularly preferable. The ionic hydrophilic group may contain cations or anions and a state where cations or anions are contained is referred to as a salt state. The carboxyl group, the phosphono group, and the sulfo group may be in the salt state. Examples of counter cations forming salts include ammonium ions, alkali metal ions (e.g., a lithium ion, a sodium ion, and a potassium ion) and organic cations (e.g., a tetramethylammonium ion, a tetramethyl guanidium ion, and a tetramethyl phosphonium) and a lithium salt, a sodium salt, a potassium salt, and an ammonium salt are preferable, a sodium salt or a mixed salt containing a sodium salt as the main component is more preferable, and a sodium salt is the most preferable.

In the invention, when the compound is a salt, the salt is present in a state of dissociating into ions in an aqueous ink.

Next, the compounds represented by General Formula (1) are described. It is preferable for the magenta dye ink of this embodiment to contain the compounds represented by General Formula (1),

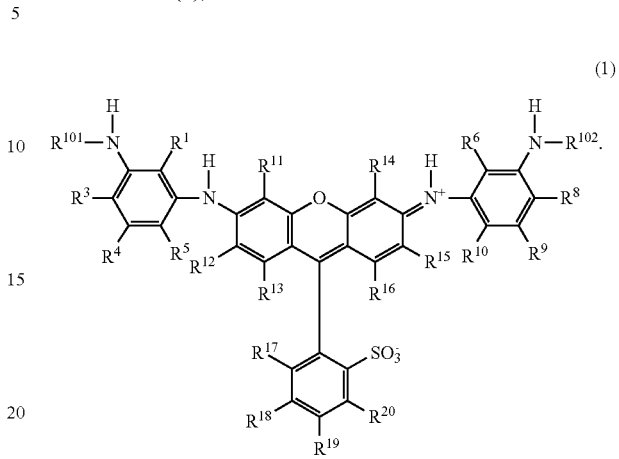

(1)

In which, in General Formula (1), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ are each independently a hydrogen atom or a substituent, $R^{101}$ and $R^{102}$ are each independently a substituted or unsubstituted alkyl group, a substituted or unsubstituted aryl group, a substituted or unsubstituted heterocyclic group, a substituted or unsubstituted alkylsulfonyl group, a substituted or unsubstituted arylsulfonyl group, a substituted or unsubstituted alkoxycarbonyl group, a substituted or unsubstituted aryloxycarbonyl group, a carbamoyl group, a substituted or unsubstituted monoalkyl aminocarbonyl group, a substituted or unsubstituted dialkyl aminocarbonyl group, a substituted or unsubstituted monoaryl aminocarbonyl group, a substituted or unsubstituted diaryl aminocarbonyl group, or a substituted or unsubstituted alkyl aryl aminocarbonyl group.

The compounds represented by General Formula (1) have amino groups having specific substituents. Although the mechanism of action is unknown, the color saturation, color developability, lightfastness, and ozone resistance in printed matter are improved due to the fact that the compounds represented by General Formula (1) have such a structure.

In General Formula (1), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ are each independently a hydrogen atom or a substituent. When $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ are substituents, the substituents selected from the substituent groups mentioned above are mentioned as the substituents.

In General Formula (1), $R^1$, $R^5$, $R^6$, and $R^{10}$ each independently preferably represent a hydrogen atom, a substituted or unsubstituted alkyl group, a substituted or unsubstituted aryl group, a substituted or unsubstituted alkoxy group, a substituted or unsubstituted aryloxy group, a carboxyl group, or a halogen atom, more preferably a substituted or unsubstituted alkyl group, a substituted or unsubstituted aryl group, and a substituted or unsubstituted alkoxy group, and particularly preferably a substituted or unsubstituted alkyl group from the viewpoint of ease of availability and synthesis of raw materials. As the alkyl group, alkyl groups having 1 or more and 6 or less carbon atoms are preferable, alkyl groups having 1 or more and 3 or less carbon atoms are more preferable, and methyl groups are still more preferable. Examples of substituents when each group has a substituent include the substituents selected from the substituent groups mentioned above.

In General Formula (1), from the viewpoint of ease of availability and synthesis of raw materials and the lightfastness, ozone resistance, color developability, and color saturation of printed matter, $R^4$ and $R^9$ are each independently preferably a hydrogen atom, a substituted or unsubstituted alkyl group, a substituted or unsubstituted aryl group, a substituted or unsubstituted alkoxy group, a substituted or unsubstituted aryloxy group, a substituted or unsubstituted amino group, a substituted or unsubstituted acylamino group, a substituted or unsubstituted alkoxycarbonylamino group, a substituted or unsubstituted alkylsulfonylamino group, a substituted or unsubstituted aryl sulfonylamino group, a substituted or unsubstituted alkylureide group, a substituted or unsubstituted arylureide group, a sulfo group, a carboxyl group, or a halogen atom, more preferably a hydrogen atom, a substituted or unsubstituted acylamino group, a substituted or unsubstituted alkoxycarbonylamino group, a substituted or unsubstituted alkylsulfonylamino group, a substituted or unsubstituted aryl sulfonylamino group, a substituted or unsubstituted alkylureide group, a substituted or unsubstituted arylureide group, or a sulfo group, and particularly preferably a hydrogen atom or a sulfo group. Examples of substituents when each group has a substituent include the substituents selected from the substituent groups mentioned above.

In General Formula (1), from the viewpoint of ease of availability and synthesis of raw materials, $R^3$ and $R^8$ are each independently preferably a hydrogen atom, a substituted or unsubstituted alkyl group, a substituted or unsubstituted aryl group, a substituted or unsubstituted alkoxy group, a substituted or unsubstituted aryloxy group, a substituted or unsubstituted amino group, a substituted or unsubstituted acylamino group, a substituted or unsubstituted alkoxycarbonylamino group, a substituted or unsubstituted alkylsulfonylamino group, a substituted or unsubstituted aryl sulfonylamino group, a substituted or unsubstituted alkylureide group, a substituted or unsubstituted arylureide group, a sulfo group, a carboxyl group, or a halogen atom, more preferably a hydrogen atom, a substituted or unsubstituted alkyl group, or a sulfo group, and particularly preferably a substituted or unsubstituted alkyl group. As the alkyl group, alkyl groups having 1 or more and 6 or less carbon atoms are preferable, alkyl groups having 1 or more and 3 or less carbon atoms are more preferable, and methyl groups are still more preferable. Examples of substituents when each group has a substituent include the substituents selected from the substituent groups mentioned above.

In General Formula (1), from the viewpoint of ease of availability and synthesis of raw materials, $R^{11}$, $R^{14}$, $R^{13}$, $R^{16}$, $R^{17}$, $R^{18}$, $R^{19}$, and $R^{20}$ are each independently preferably a hydrogen atom, a substituted or unsubstituted alkyl group, a substituted or unsubstituted aryl group, a substituted or unsubstituted alkoxy group, a substituted or unsubstituted aryloxy group, a hydroxy group, a halogen atom, or a sulfo group, more preferably a hydrogen atom, a hydroxy group, a halogen atom, or a sulfo group, and particularly preferably a hydrogen atom. Examples of substituents when each group has a substituent include the substituents selected from the substituent groups mentioned above.

In General Formula (1), from the viewpoint of ease of availability and synthesis of raw materials, $R^{12}$ and $R^{15}$ are each independently preferably a hydrogen atom, a substituted or unsubstituted alkyl group, a substituted or unsubstituted aryl group, a halogen atom, or a sulfo group and more preferably a hydrogen atom or a sulfo group. Examples of substituents when each group has a substituent include the substituents selected from the substituent groups mentioned above.

In General Formula (1), at least one of $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ preferably has an ionic hydrophilic group, such as carboxyl group, a sulfo group, or a phosphono group, from the viewpoint of solubility in water. Examples of counter cations of the ionic hydrophilic groups include hydrogen atoms (proton), alkali metal cations (lithium ion, sodium ion, or potassium ion), ammonium ions, and the like. Among the above, the alkali metal cations are preferable from the viewpoint of ease of synthesis (ease of handling as dye powder).

In General Formula (1), $R^{101}$ and $R^{102}$ are each independently a substituted or unsubstituted alkyl group, a substituted or unsubstituted aryl group, a substituted or unsubstituted heterocyclic group, a substituted or unsubstituted alkylsulfonyl group, a substituted or unsubstituted arylsulfonyl group, a substituted or unsubstituted alkoxycarbonyl group, a substituted or unsubstituted aryloxycarbonyl group, a carbamoyl group, a substituted or unsubstituted monoalkyl aminocarbonyl group, a substituted or unsubstituted dialkyl aminocarbonyl group, a substituted or unsubstituted monoaryl aminocarbonyl group, a substituted or unsubstituted diaryl aminocarbonyl group, or a substituted or unsubstituted alkyl aryl aminocarbonyl group.

As alkyl groups when $R^{101}$ and $R^{102}$ are the substituted or unsubstituted alkyl groups, alkyl groups having 1 or more and 6 or less carbon atoms are preferable, alkyl groups having 1 or more and 3 or less carbon atoms are more preferable, and methyl groups or ethyl groups are still more preferable. Examples of substituents when the alkyl groups have substituents include the substituents selected from the substituent groups mentioned above and an aryl group is preferable, and a phenyl group is particularly preferable.

As aryl groups when $R^{101}$ and $R^{102}$ are the substituted or unsubstituted aryl groups, aryl groups having 6 or more and 14 or less carbon atoms are preferable, aryl groups having 6 or more and 10 or less carbon atoms are more preferable, and phenyl groups are still more preferable. Examples of substituents when the aryl groups have substituents include the substituents selected from the substituent groups mentioned above.

As heterocyclic groups when $R^{101}$ and $R^{102}$ are the substituted or unsubstituted heterocyclic groups, triazine groups, thiazolyl groups, benzothiazolyl groups, or thiadiazolyl groups are preferable. Examples of substituents when the heterocyclic groups have substituents include the substituents selected from the substituent groups mentioned above and substituted or unsubstituted amino groups and substituted or unsubstituted sulfamoyl groups are preferable.

As alkylsulfonyl groups when $R^{101}$ and $R^{102}$ are the substituted or unsubstituted alkylsulfonyl groups, alkylsulfonyl groups having 1 or more and 6 or less carbon atoms are preferable, alkylsulfonyl groups having 1 or more and 3 or less carbon atoms are more preferable, and methyl sulfonyl groups are still more preferable. Examples of substituents when the alkylsulfonyl groups have substituents include the substituents selected from the substituent groups mentioned above.

As aryl sulfonyl groups when $R^{101}$ and $R^{102}$ are the substituted or unsubstituted aryl sulfonyl groups, aryl sulfonyl groups having 6 or more and 14 or less carbon atoms are preferable, aryl sulfonyl groups having 6 or more and 10 or less carbon atoms are more preferable, and phenyl sulfonyl groups are still more preferable. Examples of substituents when the aryl sulfonyl groups have substituents include the substituents selected from the substituent groups mentioned above and carboxyl groups are particularly preferable.

Alkoxycarbonyl groups when $R^{101}$ and $R^{102}$ are the substituted or unsubstituted alkoxycarbonyl groups are preferably represented by —COOR$^{201}$. Herein, $R^{201}$ is an alkyl group having 1 or more and 6 or less carbon atoms, preferably an alkyl group having 1 or more and 4 or less carbon atoms, and more preferably an isopropyl group. Examples of substituents when the alkoxycarbonyl groups have substituents include the substituents selected from the substituent groups mentioned above.

Aryloxycarbonyl groups when $R^{101}$ and $R^{102}$ are the substituted or unsubstituted aryloxycarbonyl groups are preferably represented by —COOR$^{202}$. Herein, $R^{202}$ is an aryl group having 6 or more and 14 or less carbon atoms, preferably an aryl group having 6 or more and 10 or less carbon atoms, and more preferably a phenyl group. Examples of substituents when the aryloxycarbonyl groups have substituents include the substituents selected from the substituent groups mentioned above and a nitro group is particularly preferable.

Monoalkyl aminocarbonyl groups when $R^{101}$ and $R^{102}$ are the substituted or unsubstituted monoalkyl aminocarbonyl groups are preferably represented by —CONHR$^{203}$. Herein, $R^{203}$ is an alkyl group having 1 or more and 12 or less carbon atoms, preferably an alkyl group having 1 or more and 10 or less carbon atoms, more preferably an alkyl group having 1 or more and 6 or less carbon atoms, still more preferably a methyl group, an ethyl group, an isopropyl group, a hexyl group, a 2-ethylhexyl group, a dodecyl group, or a cyclohexyl group, and particularly preferably an isopropyl group. Examples of substituents when the monoalkyl aminocarbonyl groups have substituents include the substituents selected from the substituent groups mentioned above and phenyl groups, carboxyl groups, substituted or unsubstituted amino groups, and hydroxyl groups are particularly preferable.

Dialkyl aminocarbonyl groups when $R^{101}$ and $R^{102}$ are the substituted or unsubstituted dialkyl aminocarbonyl groups are preferably represented by —CONR$^{204}$R$^{205}$. Herein, $R^{204}$ and $R^{205}$ are each independently an alkyl group having 1 or more and 10 or less carbon atoms, preferably an alkyl group having 1 or more and 6 or less carbon atoms, and more preferably a methyl group or an isopropyl group. Examples of substituents when the dialkyl aminocarbonyl groups have substituents include the substituents selected from the substituent groups mentioned above and a carboxyl group and an alkyloxy carbonyl group (preferably an alkyloxy carbonyl group having 2 or more and 6 or less carbon atoms and more preferably an ethyloxy carbonyl group) are particularly preferable.

Monoaryl aminocarbonyl groups when $R^{101}$ and $R^{102}$ are the substituted or unsubstituted monoaryl aminocarbonyl groups are preferably represented by —CONHR$^{206}$. Herein, $R^{206}$ is an aryl group having 6 or more and 14 or less carbon atoms, preferably an aryl group having 6 or more and 12 or less carbon atoms, and more preferably an aryl group having 6 or more and 10 or less carbon atoms. Specifically, a phenyl group, a biphenyl group, and a naphthyl group are preferable and a phenyl group is more preferable. Examples of substituents when the monoaryl aminocarbonyl groups have substituents include the substituents selected from the substituent groups mentioned above and a carboxyl group, a hydroxyl group, a phosphono group, and an alkoxy group (preferably an alkoxy group having 1 or more and 6 or less carbon atoms and more preferably a cyclohexyloxy group) are particularly preferable.

Diaryl aminocarbonyl groups when $R^{101}$ and $R^{102}$ are the substituted or unsubstituted diaryl aminocarbonyl groups are preferably represented by —CONR$^{207}$R$^{208}$. Herein, $R^{207}$ and $R^{208}$ are each independently an aryl group having 6 or more and 14 or less carbon atoms, preferably an aryl group having 6 or more and 10 or less carbon atoms, and more preferably a phenyl group. Examples of substituents when the diaryl aminocarbonyl groups have substituents include the substituents selected from the substituent groups mentioned above.

From the viewpoint of the color saturation, lightfastness, and ozone resistance of printed matter, $R^{101}$ and $R^{102}$ are preferably substituted or unsubstituted alkylsulfonyl groups, substituted or unsubstituted arylsulfonyl groups, substituted or unsubstituted alkoxycarbonyl groups, substituted or unsubstituted aryloxycarbonyl groups, carbamoyl groups, substituted or unsubstituted monoalkyl aminocarbonyl groups, substituted or unsubstituted dialkyl aminocarbonyl groups, substituted or unsubstituted monoaryl aminocarbonyl groups, or substituted or unsubstituted diaryl aminocarbonyl groups, more preferably substituted or unsubstituted alkylsulfonyl groups, substituted or unsubstituted arylsulfonyl groups, substituted or unsubstituted monoalkyl aminocarbonyl groups, substituted or unsubstituted dialkyl aminocarbonyl groups, substituted or unsubstituted monoaryl aminocarbonyl groups, or substituted or unsubstituted diaryl aminocarbonyl groups, and particularly preferably substituted or unsubstituted monoalkyl aminocarbonyl groups, substituted or unsubstituted dialkyl aminocarbonyl groups, substituted or unsubstituted monoaryl aminocarbonyl groups, or substituted or unsubstituted diaryl aminocarbonyl groups.

Specific examples (exemplary compounds) of the compounds represented by General Formula (1) are given below but are not limited thereto. In the structural formulae of the following exemplary compounds, Me is a methyl group, Et is an ethyl group, i-Pr is an isopropyl group, and n-Bu is an n-butyl group. The ratios in R and M are molar ratios.

(1-1)

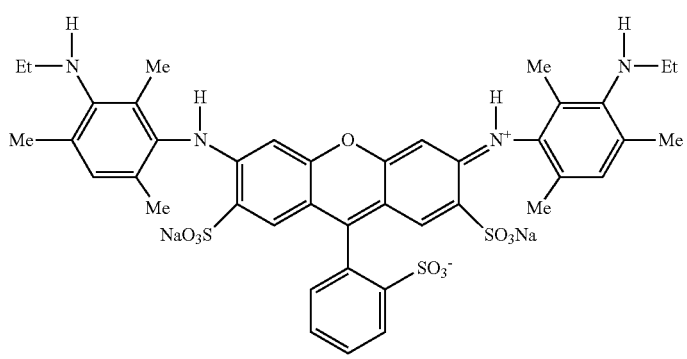

-continued
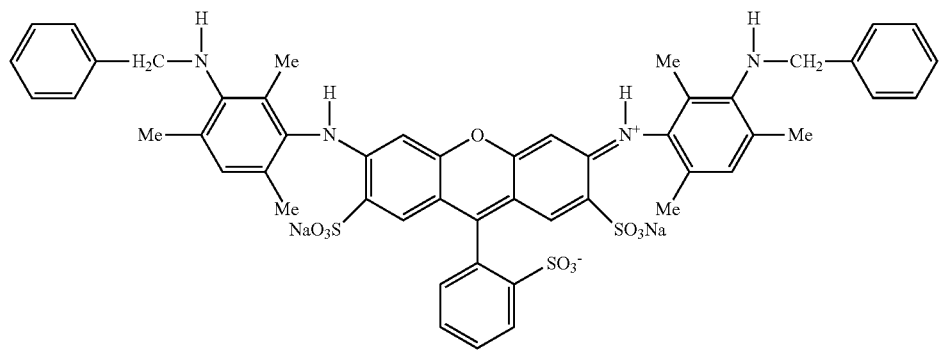
(1-2)
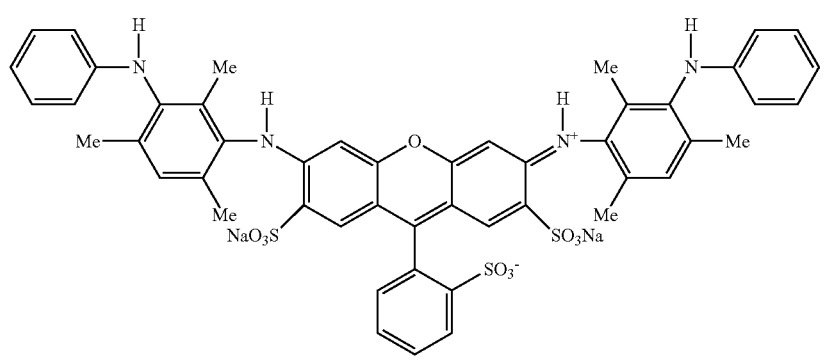
(1-3)
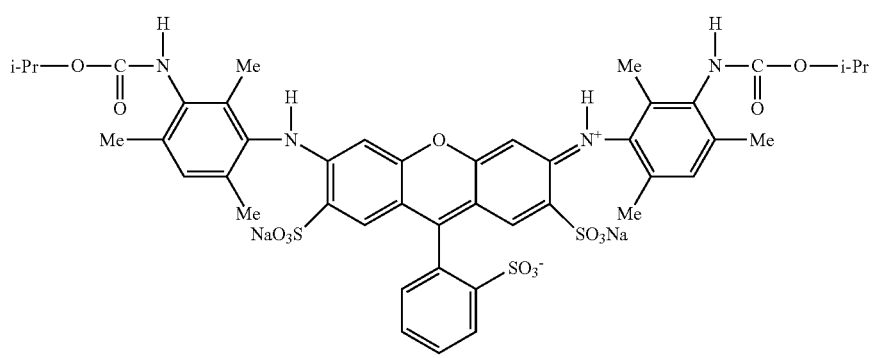
(1-4)
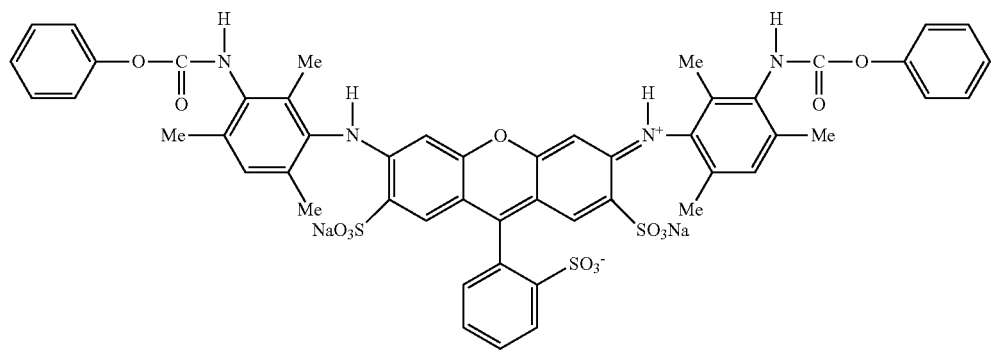
(1-5)

-continued
(1-6)
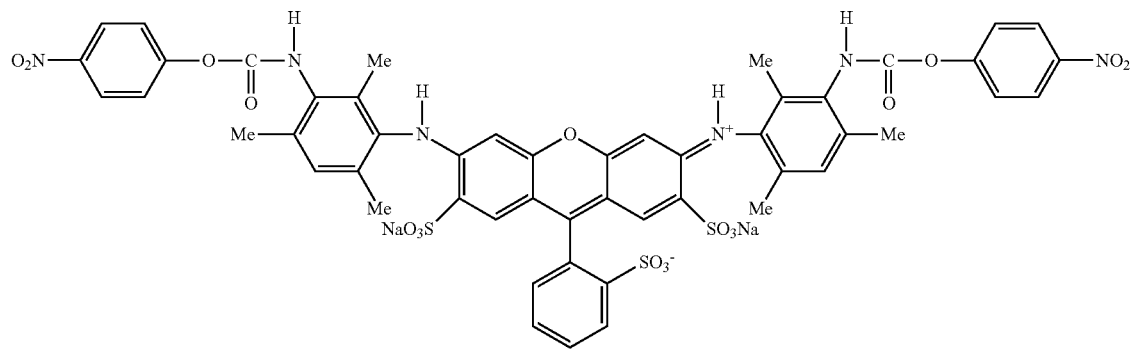
(1-7)
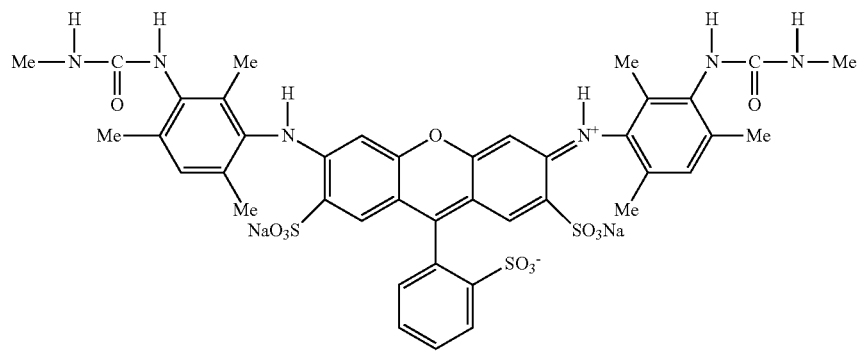
(1-8)
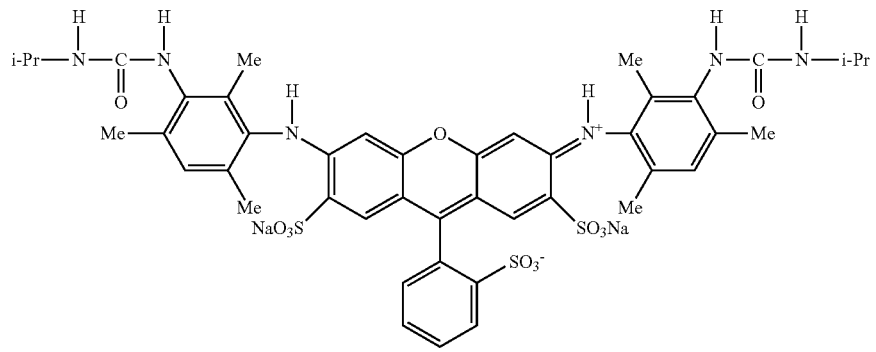
(1-9)
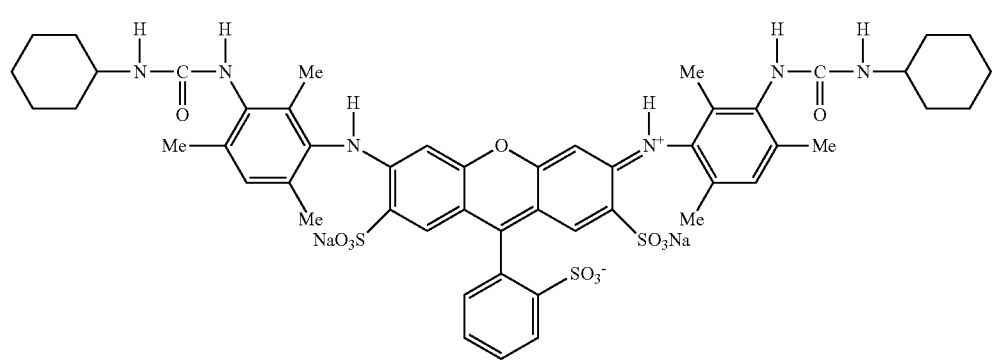

-continued
(1-10)
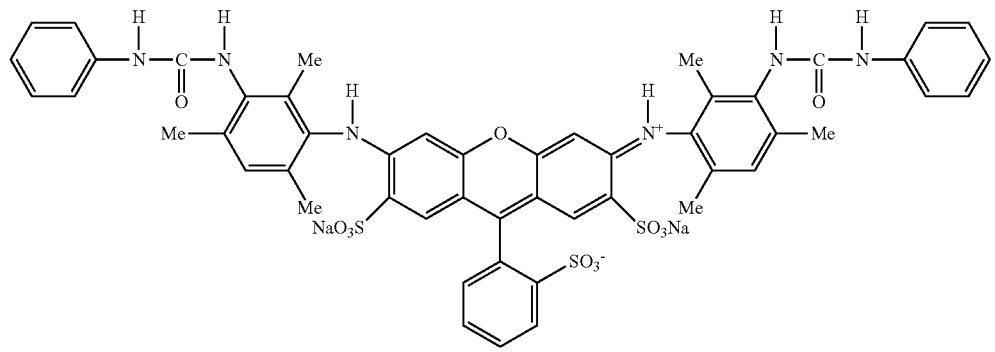
(1-11)
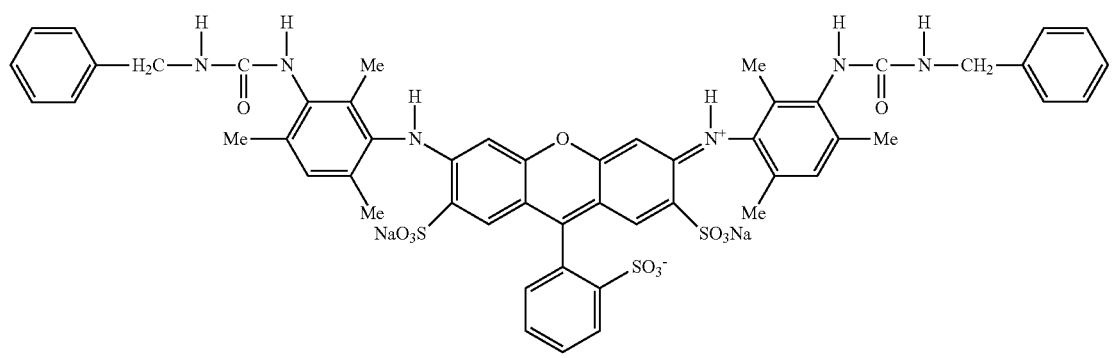
(1-12)
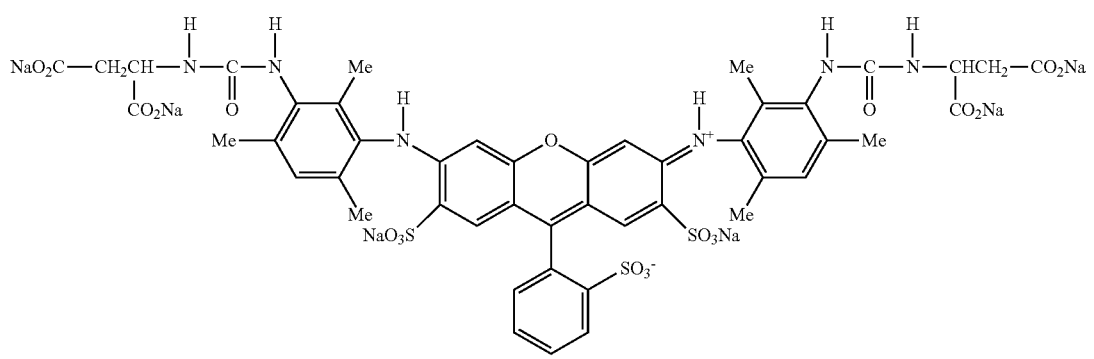
(1-13)
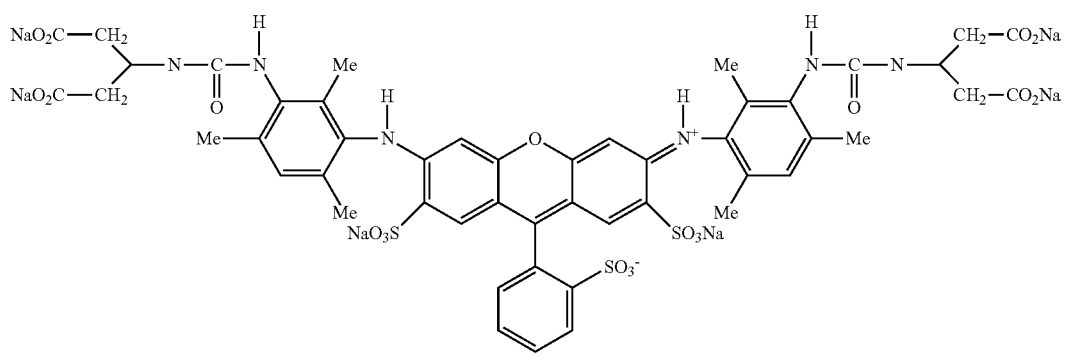

-continued
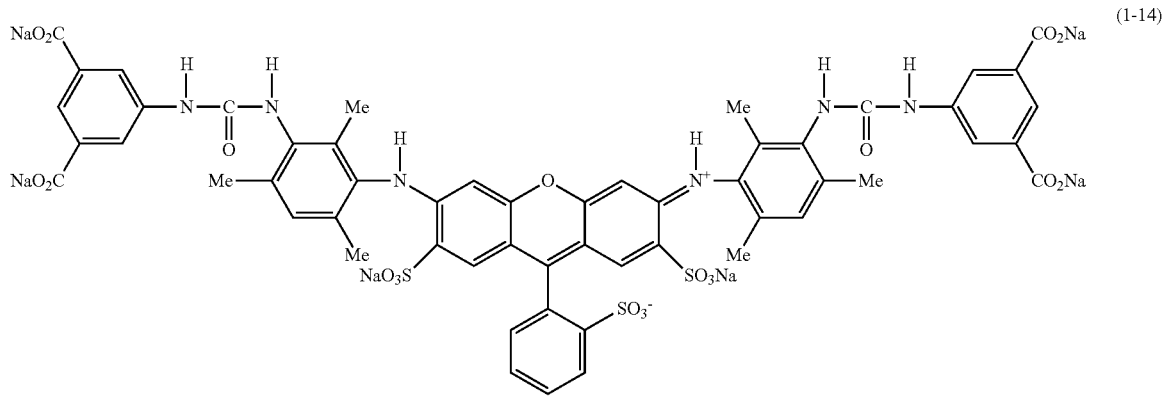
(1-14)
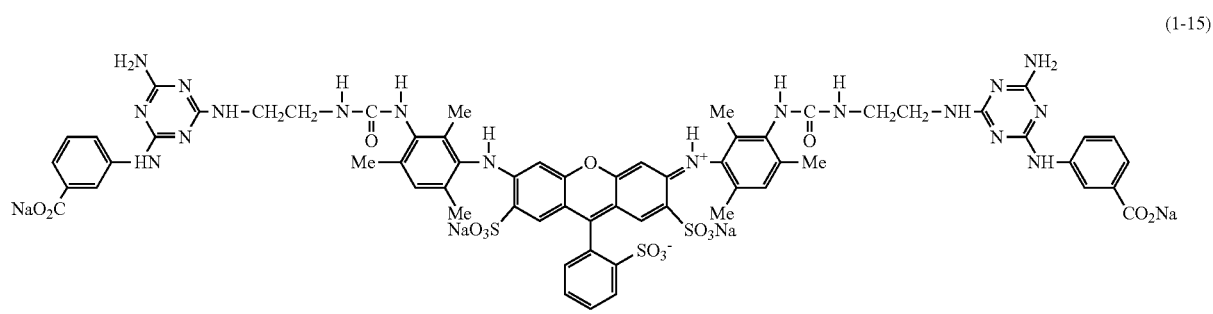
(1-15)
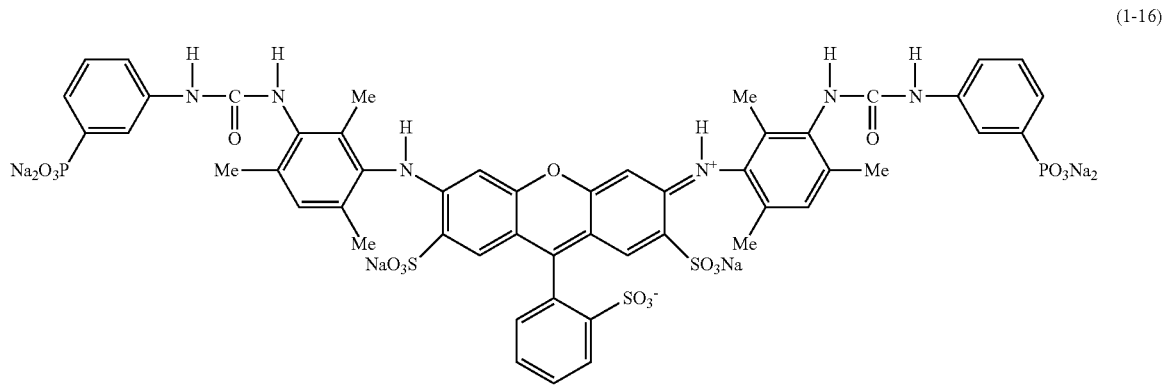
(1-16)
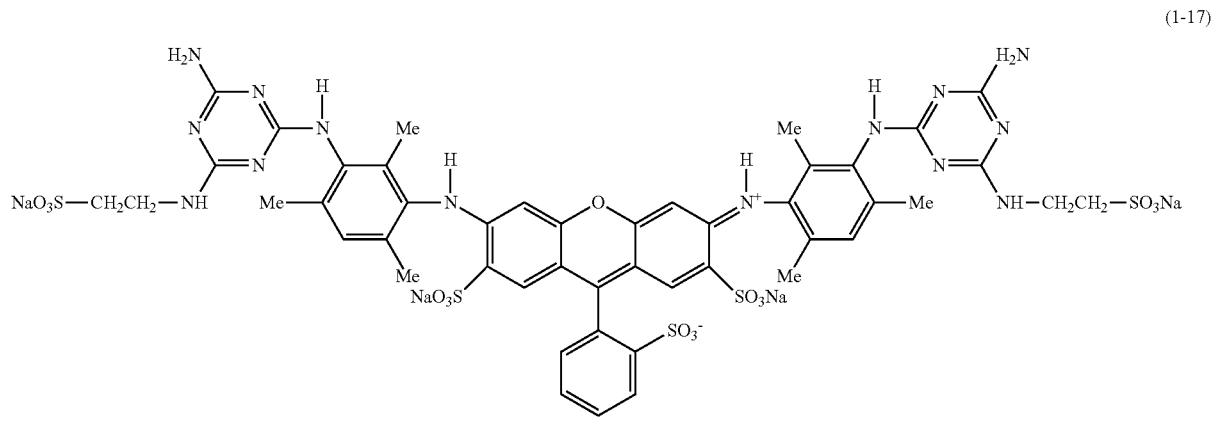
(1-17)

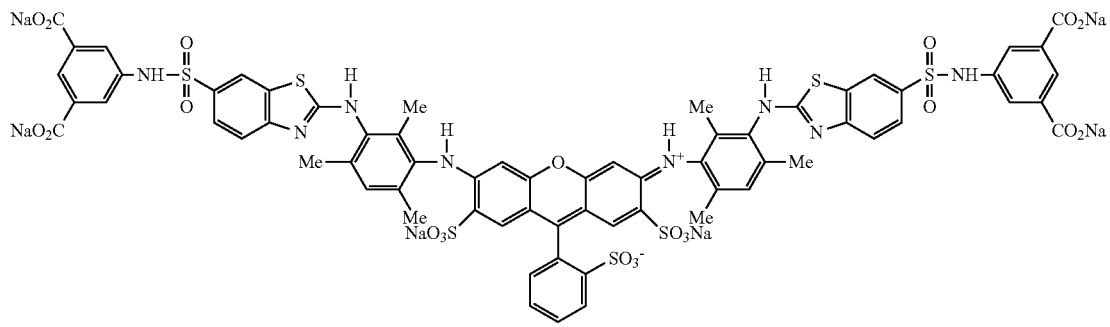
(1-18)
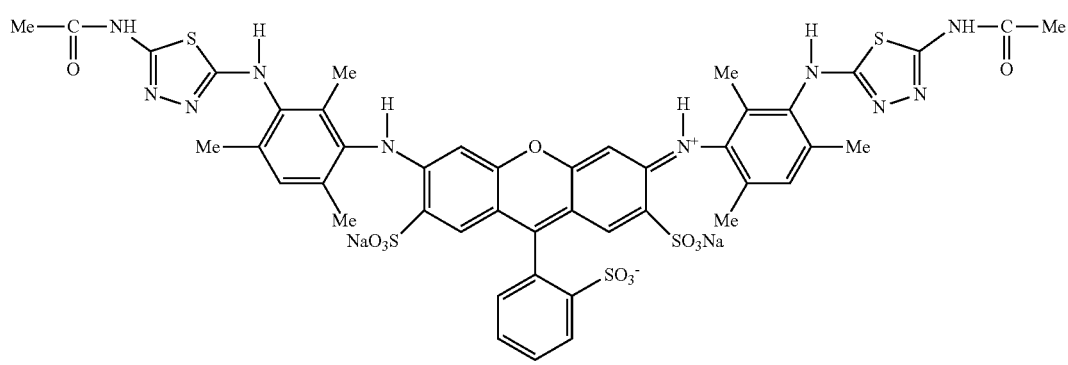
(1-19)
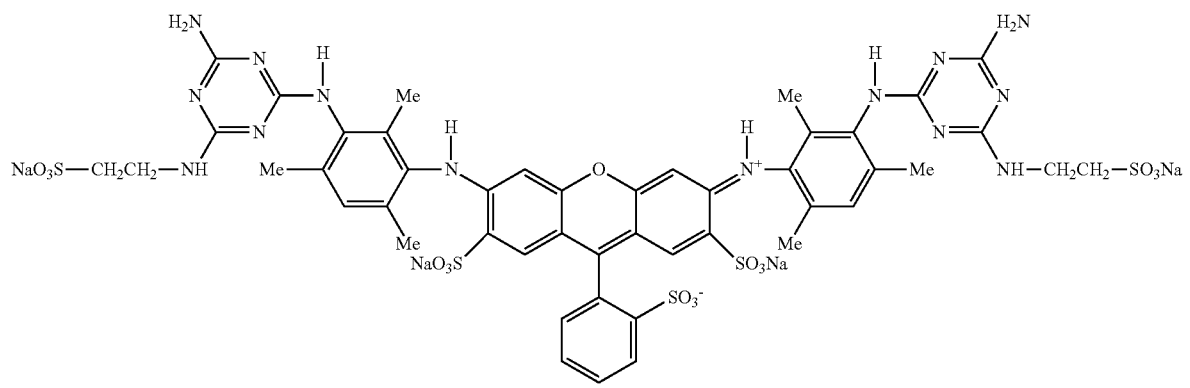
(1-17)
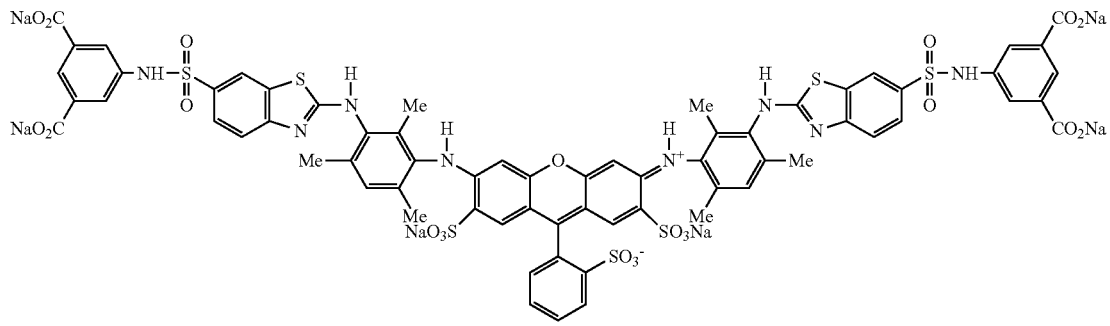
(1-18)

-continued
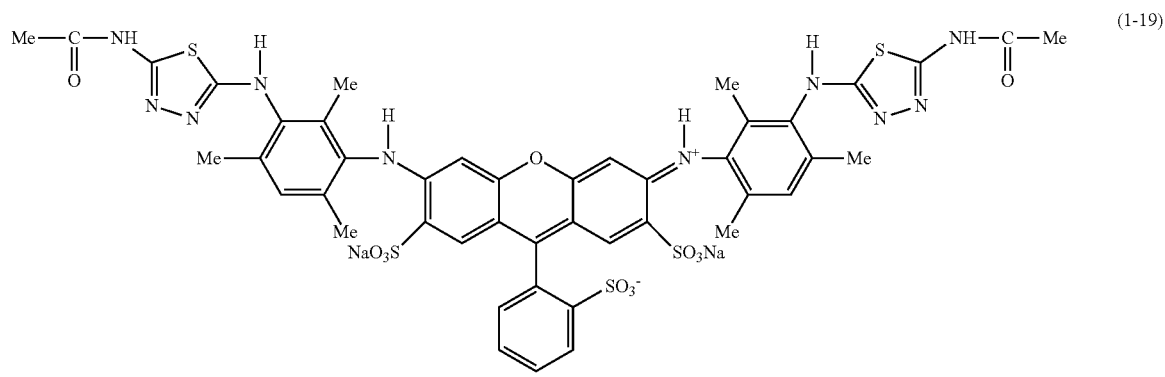
(1-19)
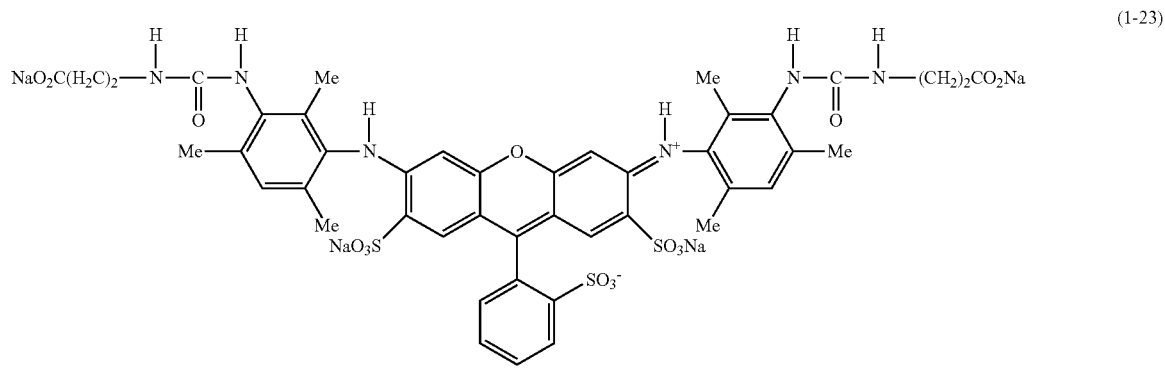
(1-23)
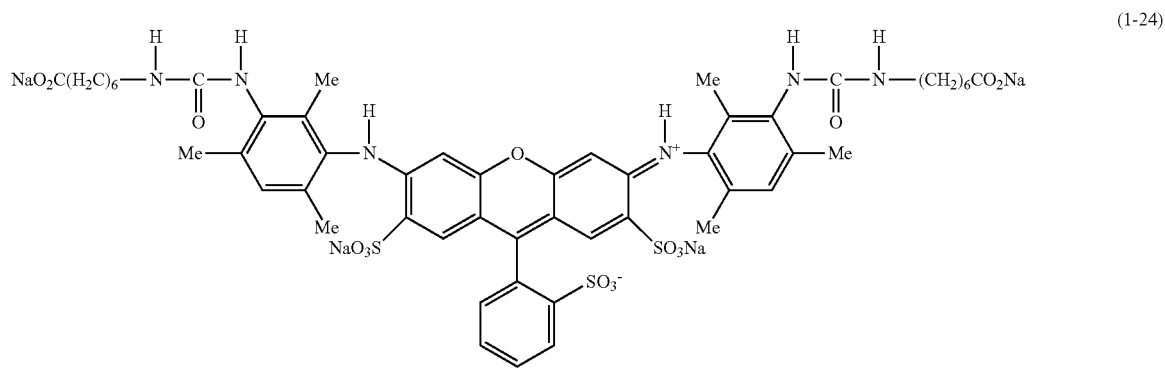
(1-24)
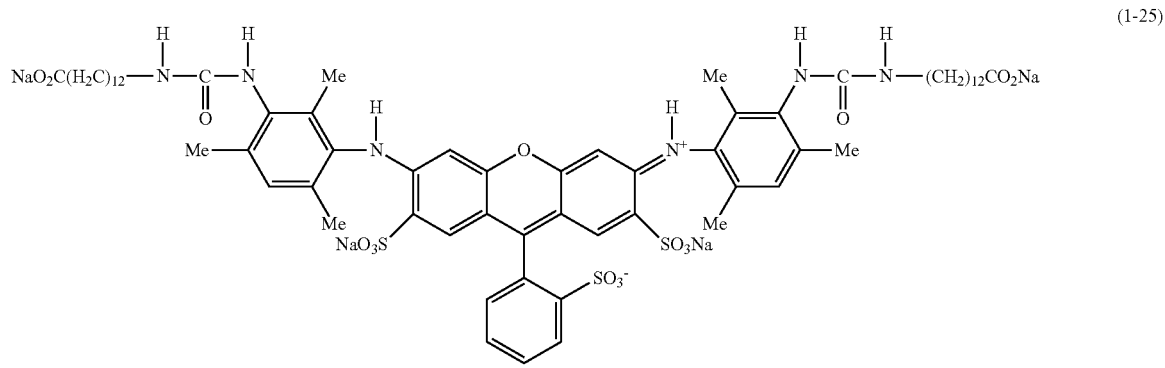
(1-25)

-continued
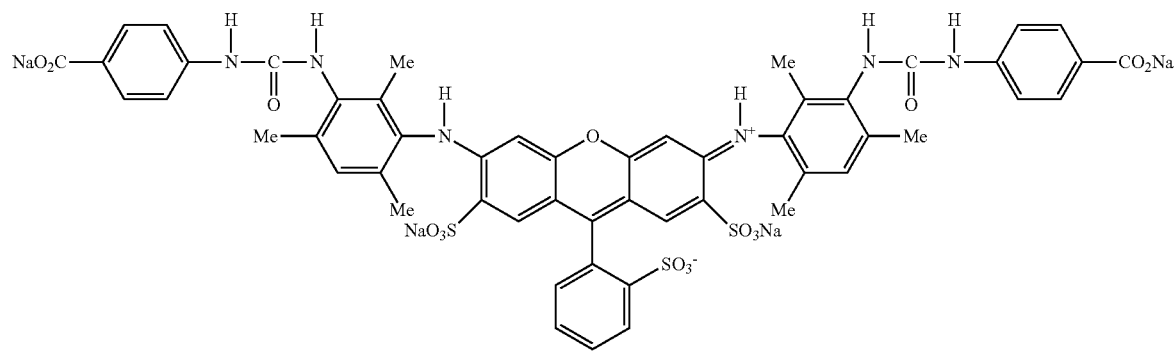
(1-26)
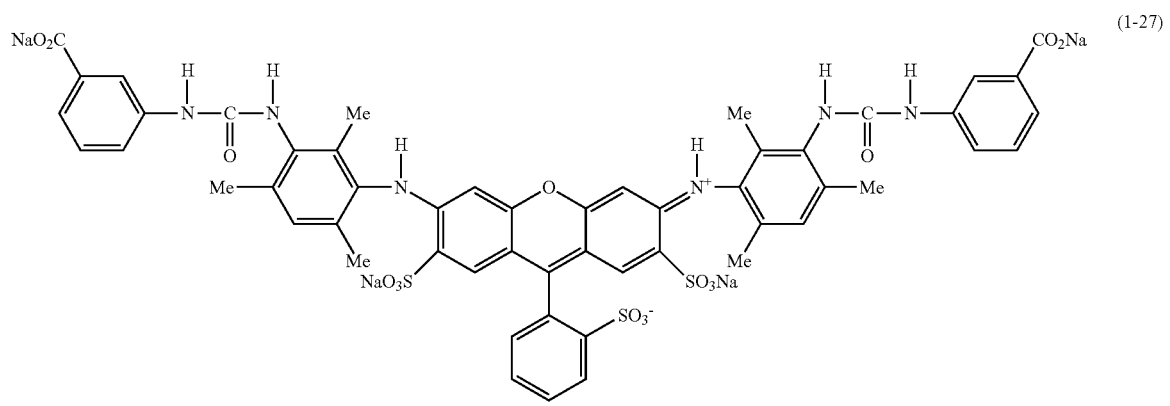
(1-27)
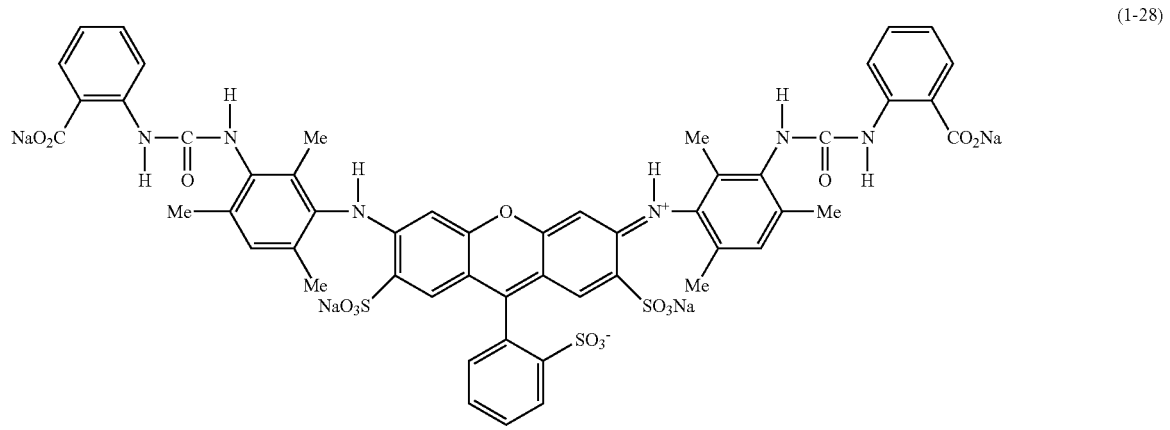
(1-28)
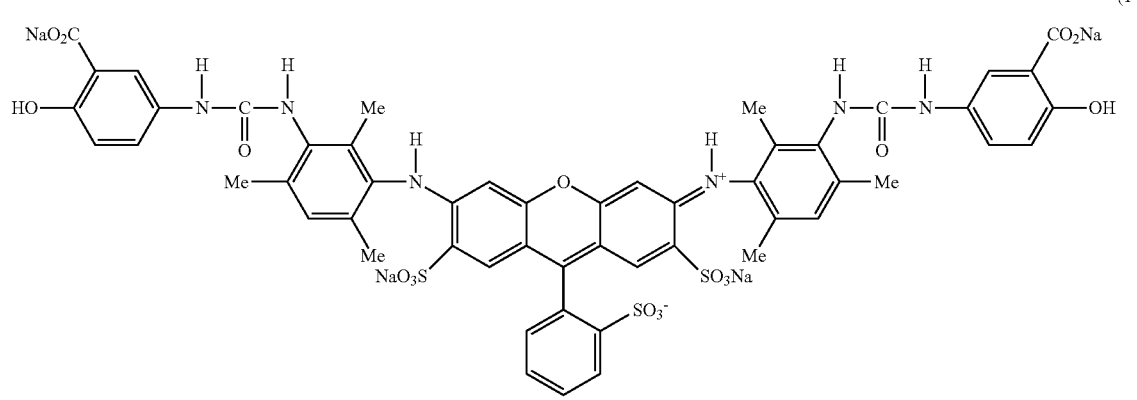
(1-29)

(1-30)
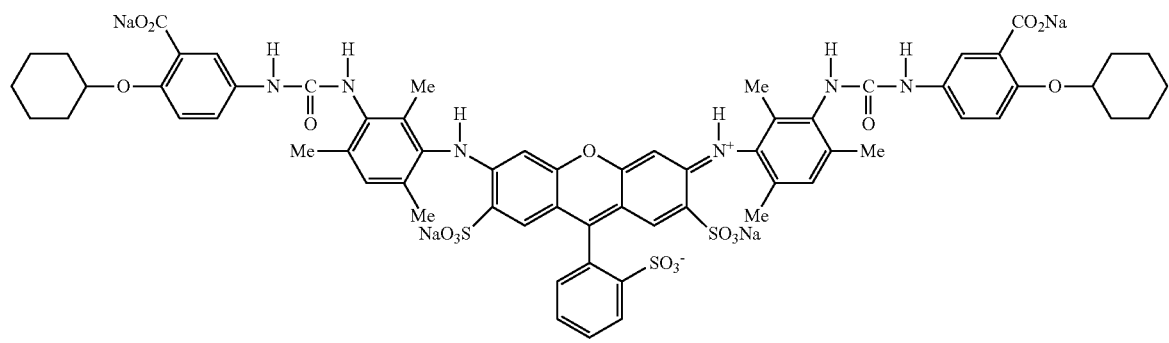
(1-31)
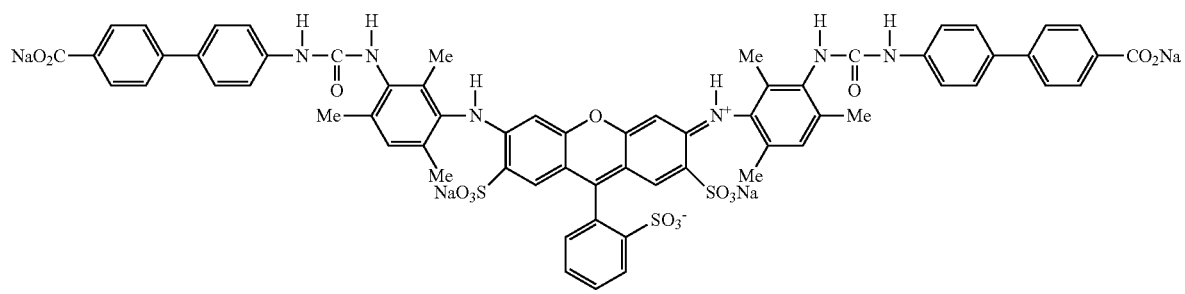
(1-32)
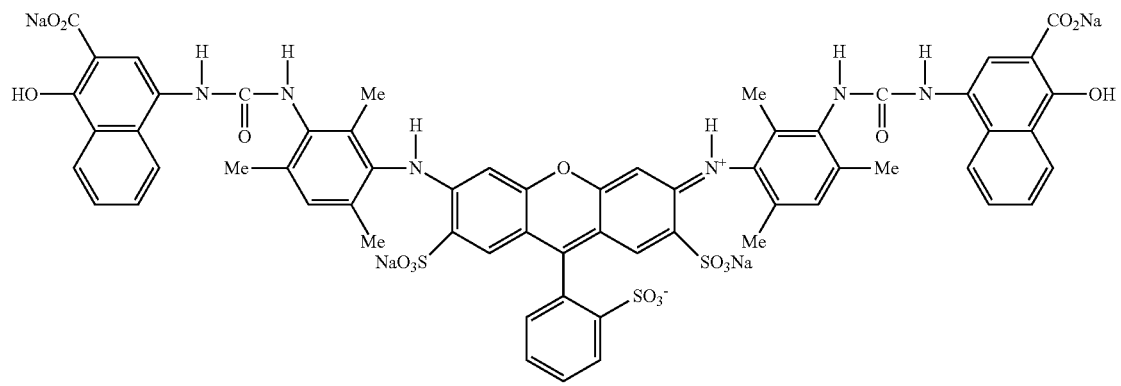
(1-33)
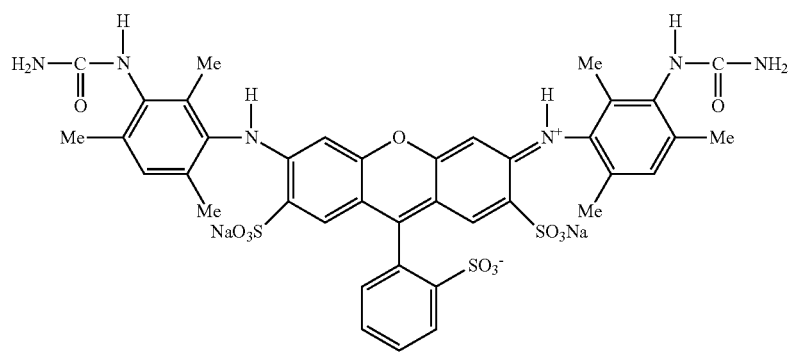

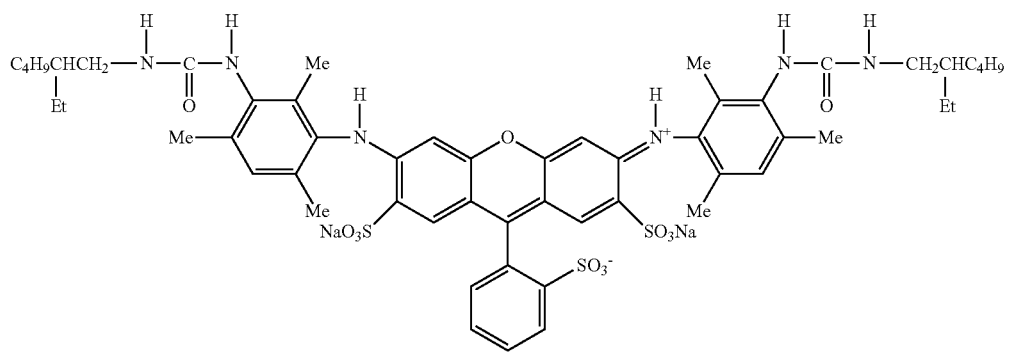
(1-34)
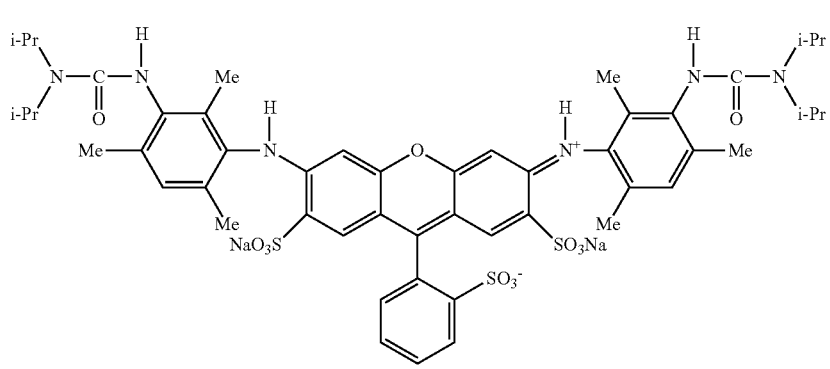
(1-35)
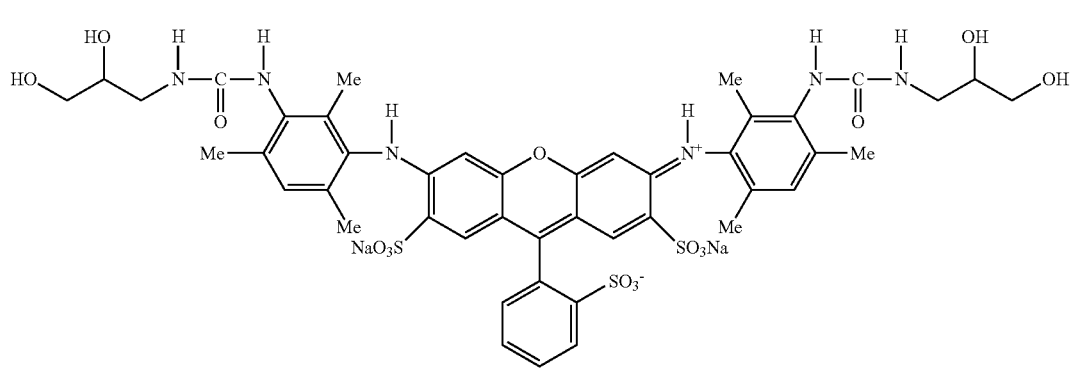
(1-36)
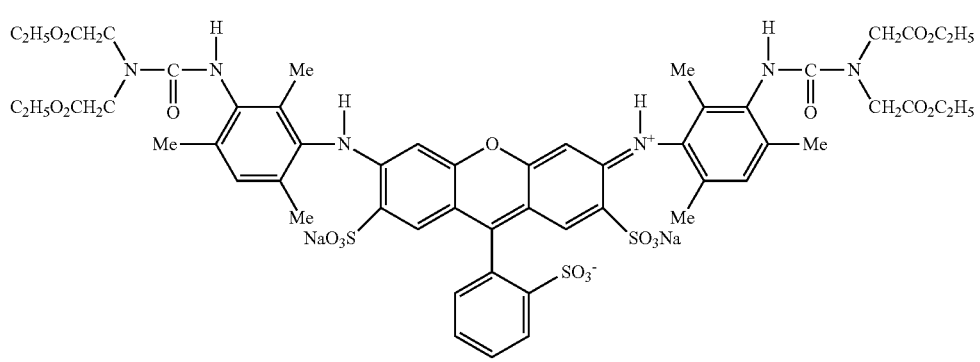
(1-37)

-continued
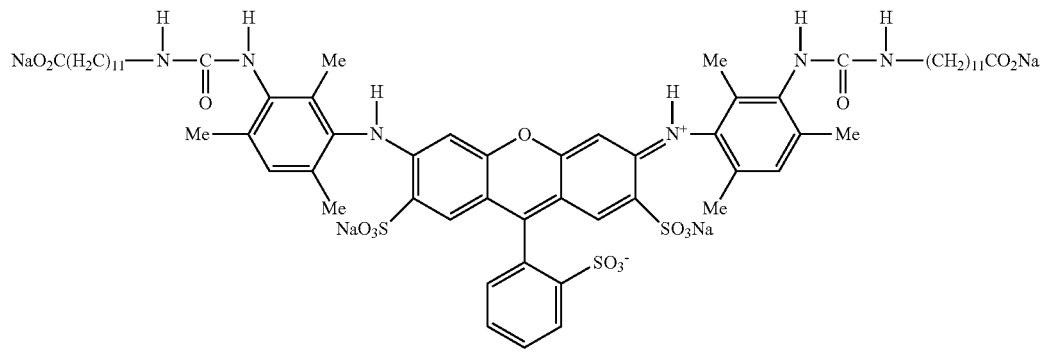
(1-38)
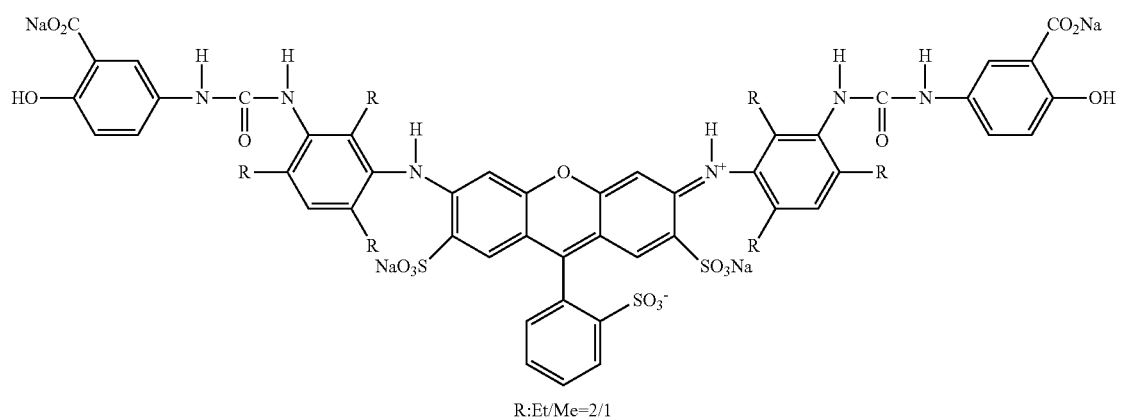
(1-39)
R:Et/Me=2/1
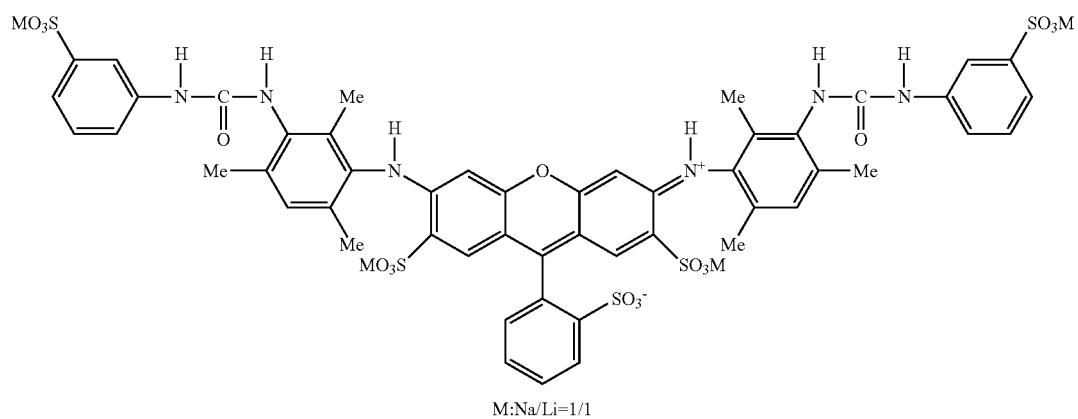
(1-40)
M:Na/Li=1/1
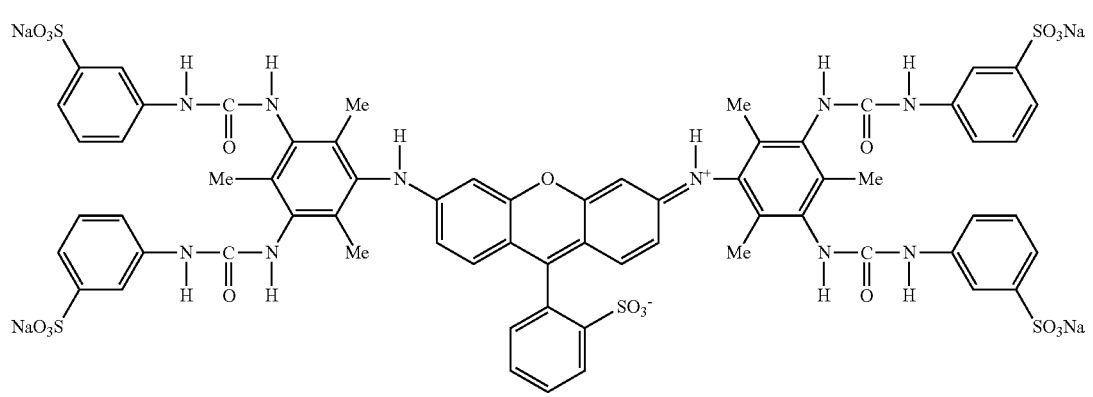
(1-41)

-continued
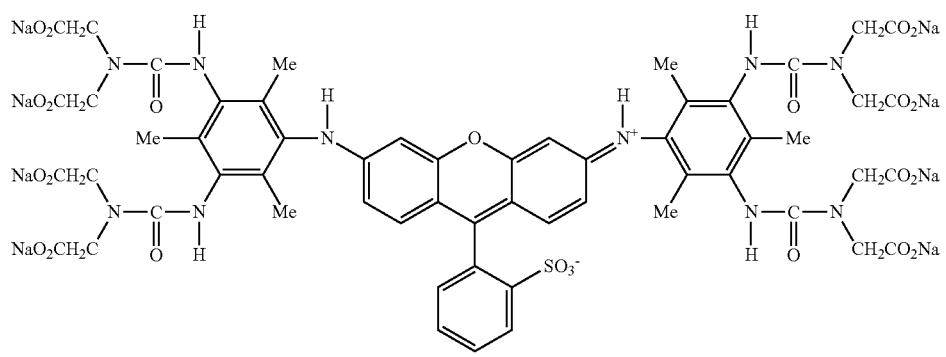
(1-42)
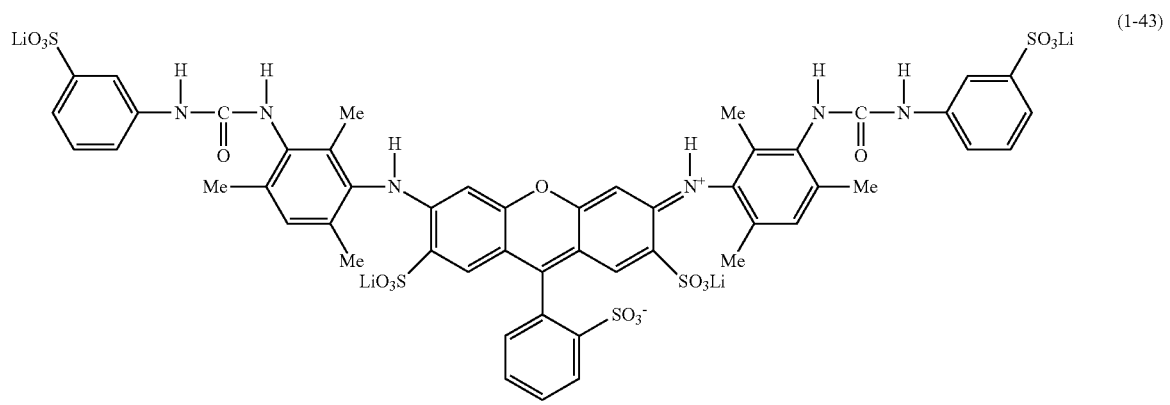
(1-43)
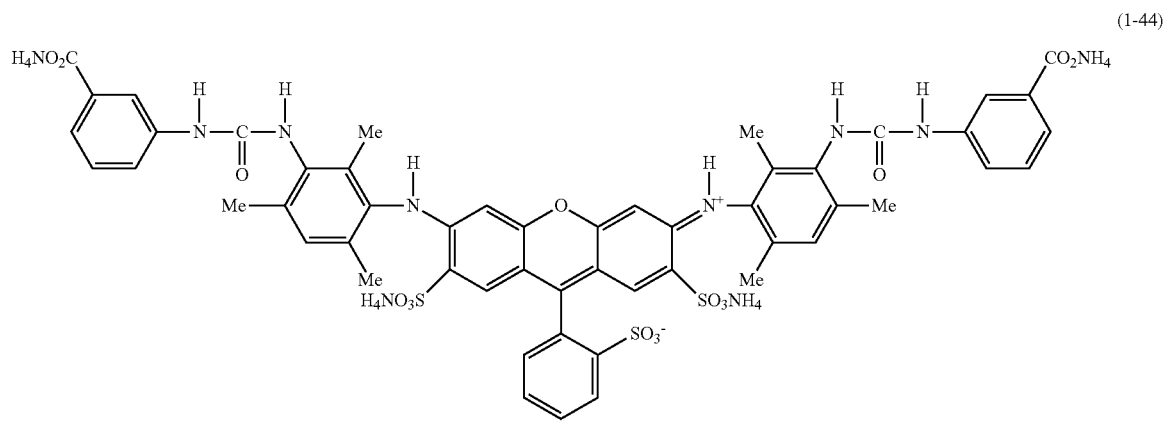
(1-44)
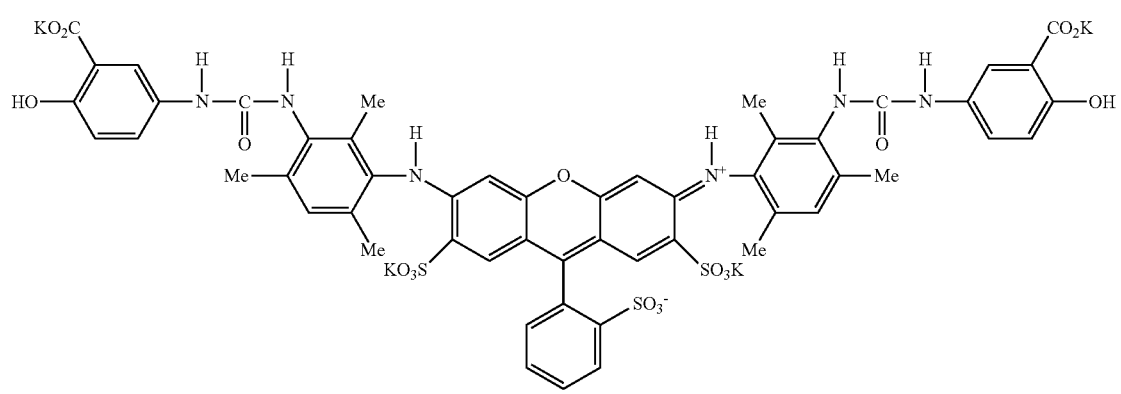
(1-45)

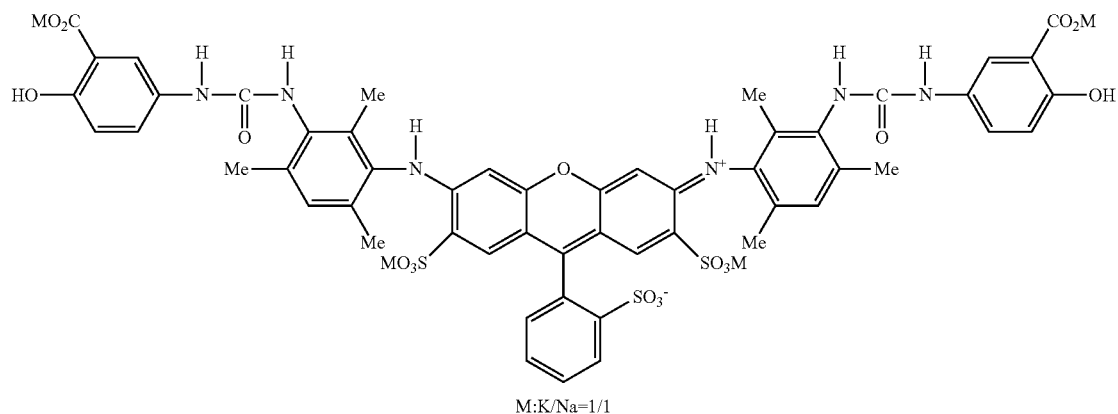
(1-46)
M:K/Na=1/1
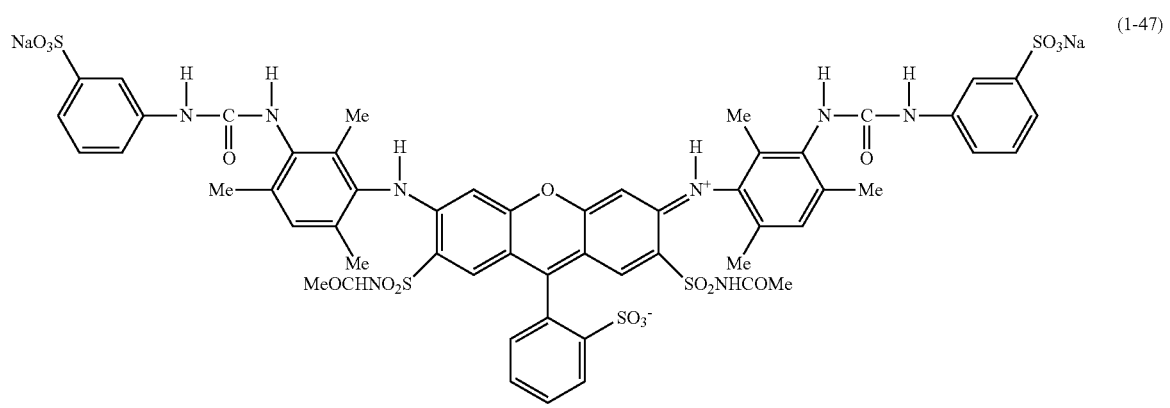
(1-47)
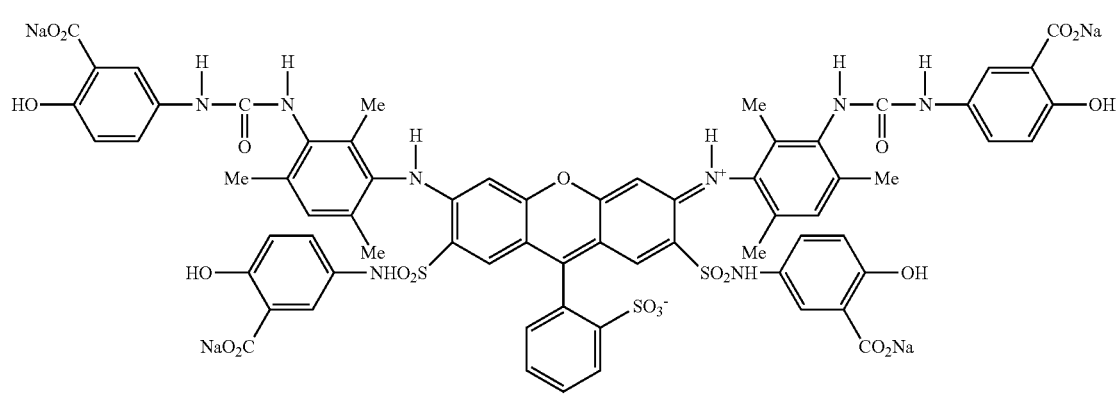
(1-48)
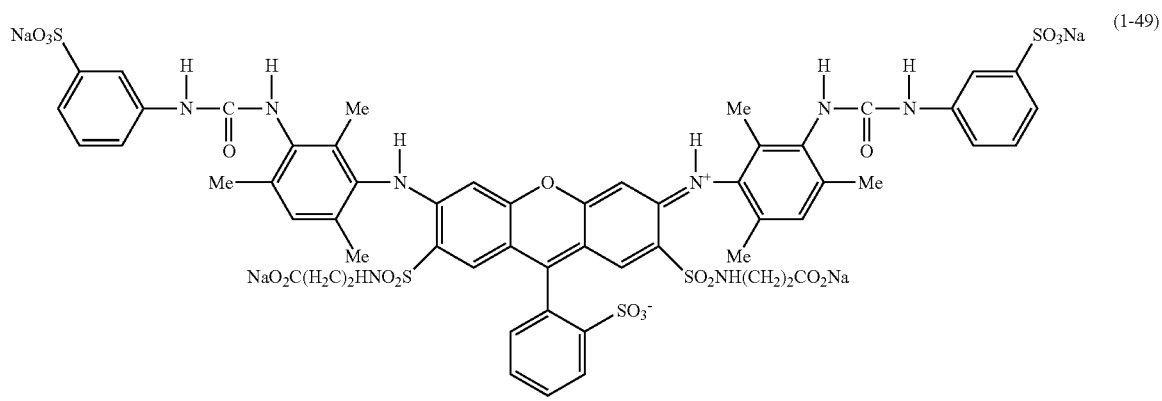
(1-49)

-continued
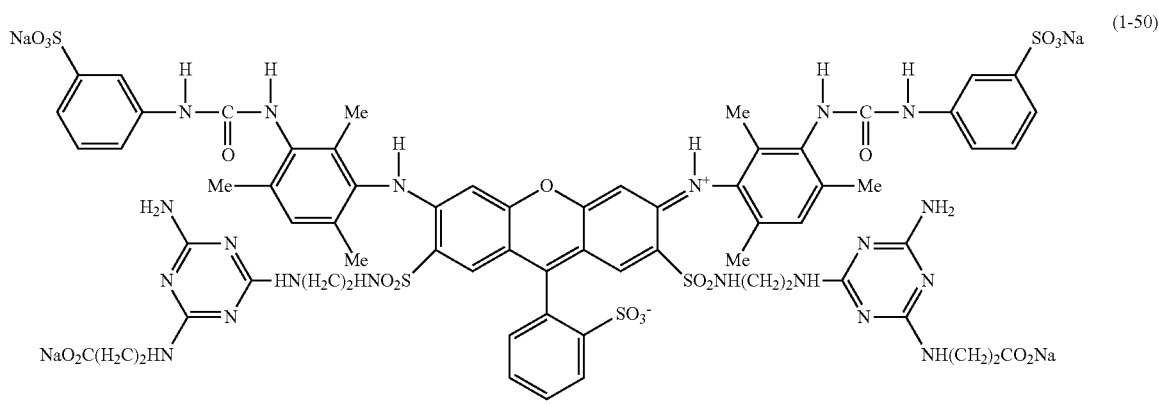
(1-50)
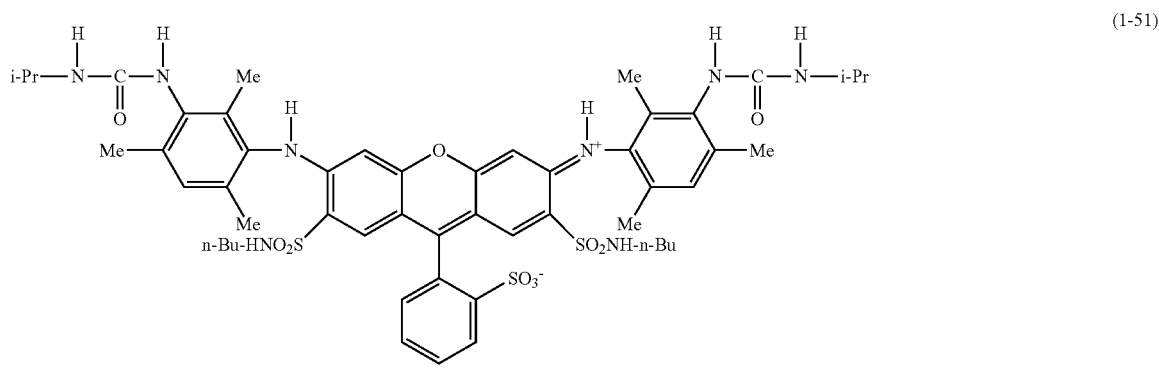
(1-51)
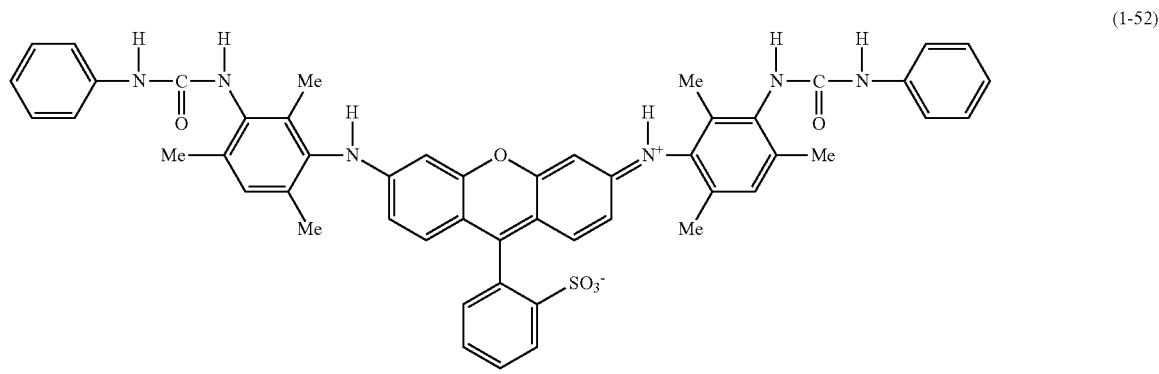
(1-52)
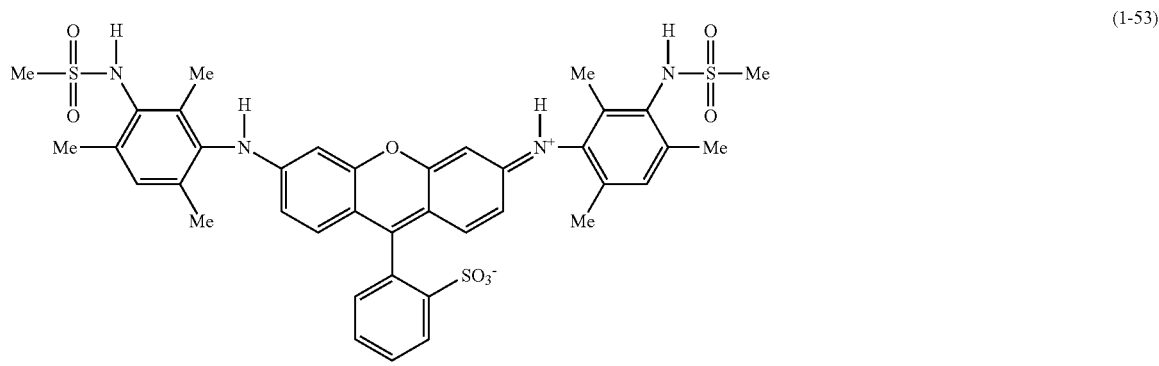
(1-53)

(1-54)
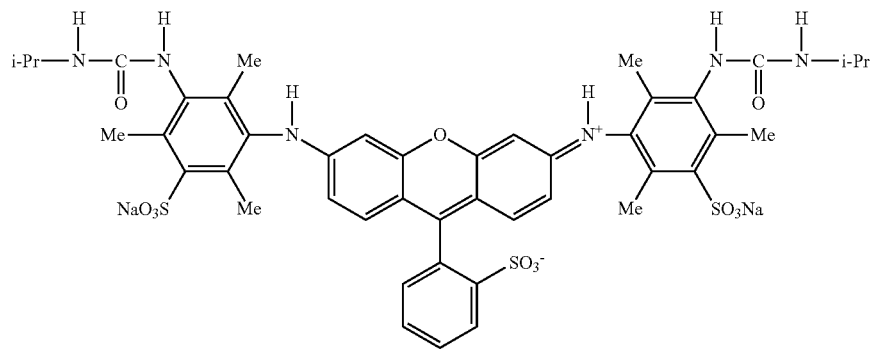
(1-55)
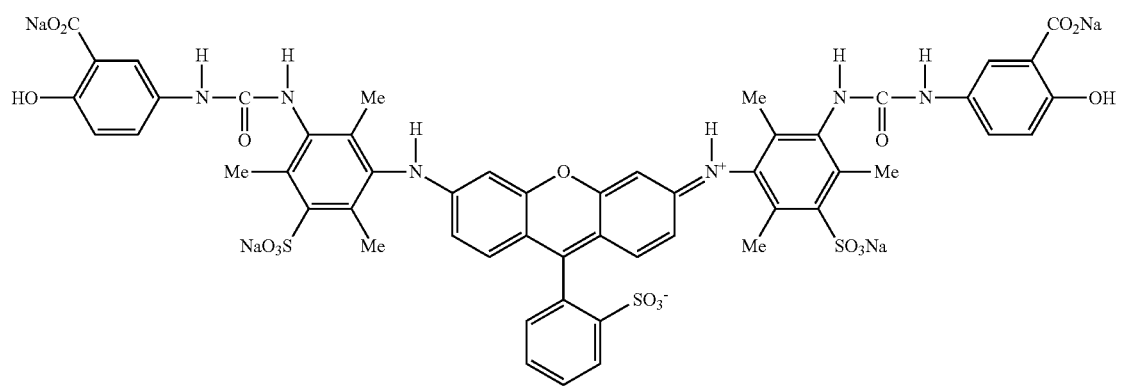
(1-56)
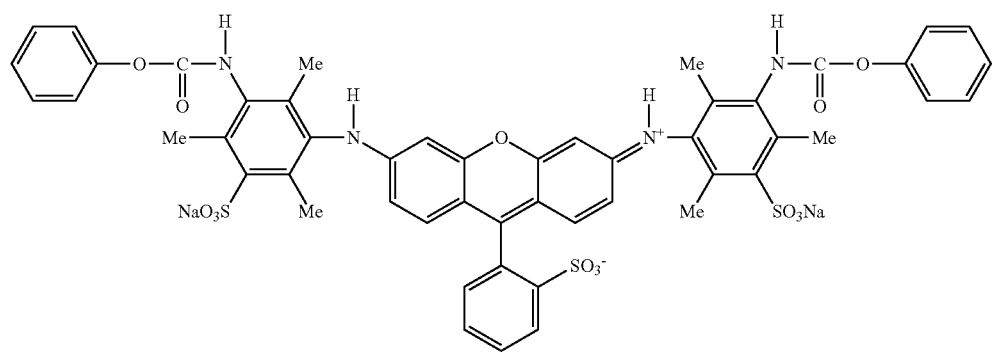
(1-57)
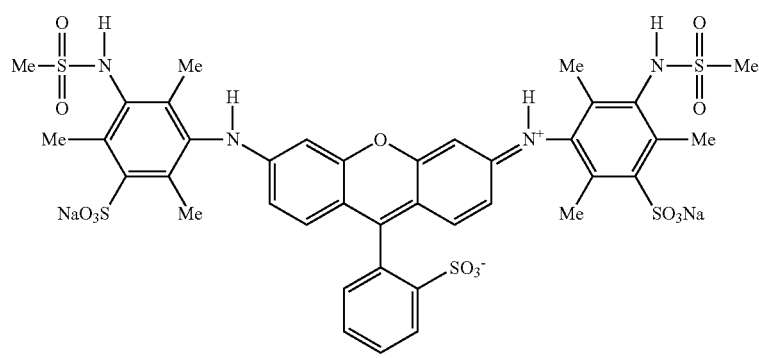

Synthesis methods are described for some of the exemplary compounds given above but are not limited thereto. In the following description, "%" and "parts" are "% by mass" and a "part by mass", respectively, unless otherwise particularly specified.

Synthesis of Exemplary Compound (1-20)

The exemplary compound (1-20) can be synthesized according to the following scheme, for example.

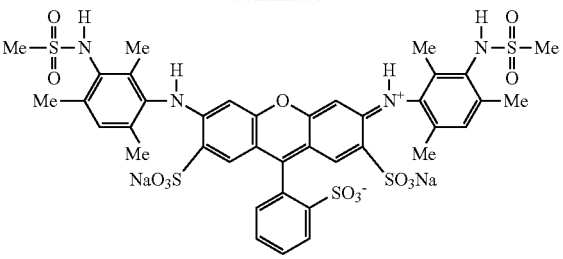

Exemplary Compound (1-20)

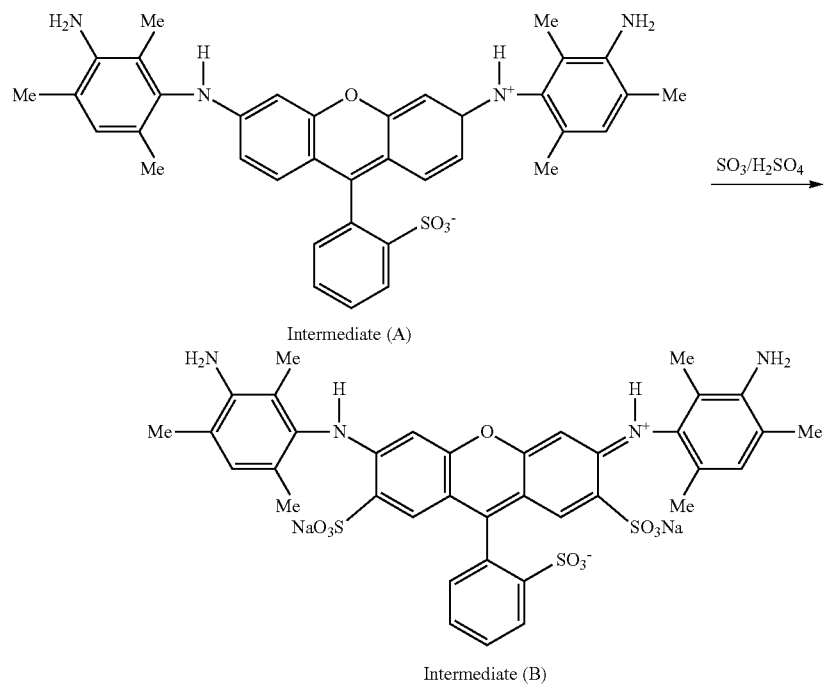

Intermediate (A)

Intermediate (B)

Synthesis of Intermediate (B)

23.0 g of an intermediate (A) (synthesized by a method described in Paragraph Number 0065 on Page 17 of JP-A-2011-148973) was added to 420 g of 10% fuming sulfuric acid, and then the mixture was made to react at room temperature for 48 hours. The reaction liquid was injected into a large excess of ethyl acetate, and then the deposited crystal was separated by filtration. The filtered crystal was dissolved in 500 mL of methanol, and then adjusted to pH 7 using a 28% sodium methoxide methanol solution. Then, the deposited sodium sulfate was removed by filtration. The filtrate was concentrated using a rotary evaporator, and then the obtained residue was purified by column chromatography (Filler: Sephadex LH-20 (manufactured by Pharmaciam, Developing solvent: methanol) to give a crystal of the intermediate (B).

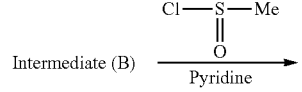

Intermediate (B) $\xrightarrow{\text{Pyridine}}$

Synthesis of Exemplary Compound (1-20)

4 g of the intermediate (B) was added to 2.0 g of methane sulfonyl chloride, 8 mL of pyridine was slowly added dropwise, and then the mixture was made to react at room temperature for 3 hours. The reaction liquid was added to a large excess of ethyl acetate, and then the deposited crystal was separated by filtration. The obtained crystal was dissolved in 50 mL of water, and then adjusted to pH 7 with a dilute sodium hydroxide aqueous solution. Then, the obtained aqueous solution was purified by column chromatography (Filler: Sephadex LH-20 (manufactured by Pharmacia), Developing solvent: water/methanol) to obtain a green gloss crystal of the exemplary compound (1-20). The maximum absorption wavelength in a dilute aqueous solution of the exemplary compound (1-20) was 533 nm.

Herein, the maximum absorption wavelength of the compound to be used as a dye can be measured using a spectrum photometer. Specifically, the compound was dissolved and diluted using water, such as ion exchange water, by 1000 times in terms of the mass ratio to prepare a dilute aqueous solution of the compound. The dilute aqueous solution was measured for the UV-Vis (Ultraviolet ray-Visible light) spectrum using an ultraviolet-visible near infrared spectrophotometer V-770 (Jasco Corp.) as a spectrum photometer, for example. The largest absorption wavelength in the obtained UV-Vis spectrum is defined as the maximum absorption wavelength.

Synthesis of Exemplary Compound (1-27)

The exemplary compound (1-27) can be synthesized via the exemplary compound (1-5) according to the following scheme, for example.

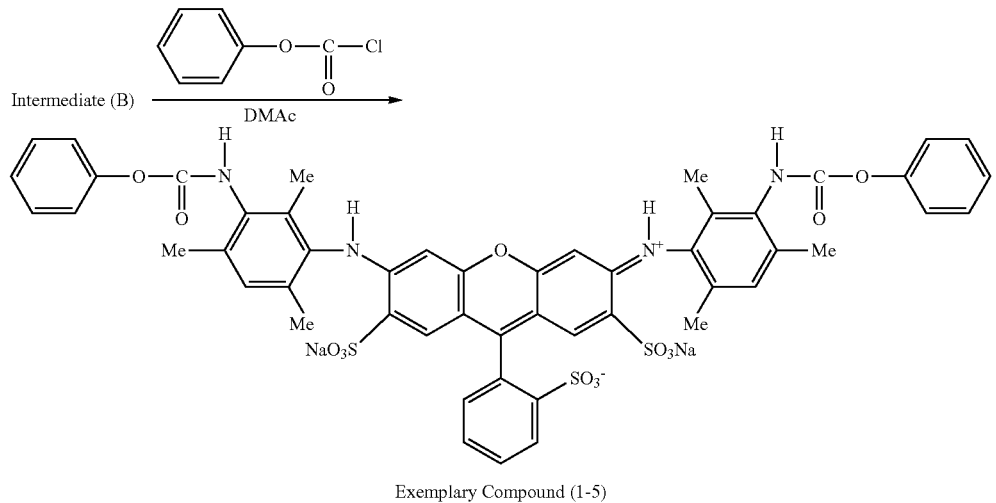

Exemplary Compound (1-5)

Synthesis of Exemplary Compound (1-5)

20 g of the intermediate (B) was dissolved in 120 mL of N,N-dimethyl acetamide (DMAc), and then the internal temperature was reduced to 0° C. 10 mL of phenyl chloroformate (TOKYO CHEMICAL INDUSTRY CO., LTD.) was added dropwise thereto while setting the internal temperature to 5° C. or less, and then the mixture was made to react at 0 to 5° C. for 90 minutes. The obtained reaction liquid was injected into 1500 mL of ethyl acetate. The deposited crystal was separated by filtration, dissolved in 200 mL of water, and then adjusted to pH 7 with a dilute sodium hydroxide aqueous solution. Then, the obtained aqueous solution was purified by column chromatography (Filler: Sephadex LH-20 (manufactured by Pharmacia), Developing solvent: water/methanol). The resultant substance was concentrated by a rotary evaporator, and then dissolved in water again. Then, strongly acidic ion exchange resin (Amberlite IR124-H (Trade Name), Organo Corporation) was passed, the pH was adjusted to 7 using a dilute sodium hydroxide aqueous solution, dust removal and filtration were performed using a membrane filter, and then the resultant substance was concentrated and dried to give a green glossy solid of the exemplary compound (1-5). The maximum absorption wavelength in a dilute aqueous solution of the exemplary compound (1-5) was 531 nm.

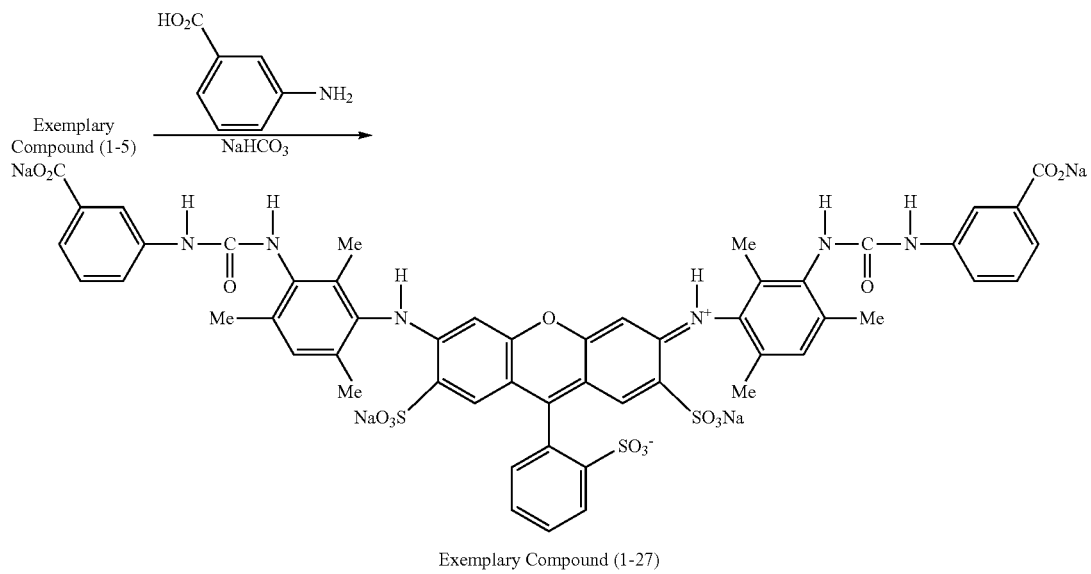

Exemplary Compound (1-27)

Synthesis of Exemplary Compound (1-27)

5.4 g of the exemplary compound (1-5) was dissolved in 20 mL of water and 40 mL of methanol, 2.0 g of m-aminobenzoic acid (TOKYO CHEMICAL INDUSTRY CO., LTD. company) and 2.0 g of sodium hydrogencarbonate were added, and then the mixture was made to react at an internal temperature of 80° C. for 6 hours. The obtained reaction liquid was injected into 500 mL of 2-propanol. The deposited crystal was separated by filtration, dissolved in 100 mL of water, and then adjusted to pH 7 with a dilute sodium hydroxide aqueous solution. The obtained aqueous solution was purified by column chromatography (Filler: Sephadex LH-20 (manufactured by Pharmacia), Developing solvent: water/methanol). The resultant substance was concentrated by a rotary evaporator, and then dissolved in water again. Then, strongly acidic ion exchange resin (Amberlite IR124-H (Trade Name), Organo Corporation) was passed, the pH was adjusted to 7 using a dilute sodium hydroxide aqueous solution, dust removal and filtration were performed using a membrane filter, and then the resultant substance was concentrated and dried to give a green glossy solid of the exemplary compound (1-27). The maximum absorption wavelength in the dilute aqueous solution of the exemplary compound (1-27) was 533 nm.

The other exemplary compounds can also be synthesized according to the method described above.

A description on the molecular structures and the synthesis methods of the substituent groups mentioned above and the compounds of General Formula (1) to the exemplary compounds (1 to 27) is disclosed in Patent Document: JP-A-2016-41801.

By the use of the compounds described above as dyes for a magenta dye ink, the generation of an aggregate is further suppressed even when mixed with a pigment ink, so that the color developability of printed matter is further improved. Furthermore, the ozone resistance and lightfastness of printed matter can be improved.

Examples of the other dyes of magenta dye inks include C.I. Reactive Red 141, C.I. Acid Red 249, the compound represented by the following general formula (M-1), the compound represented by the following general formula (M-2), and the like. At least one of the dyes may be used. The magenta dye ink may also contain dyes other than the dyes mentioned above insofar as the object of the invention can be achieved.

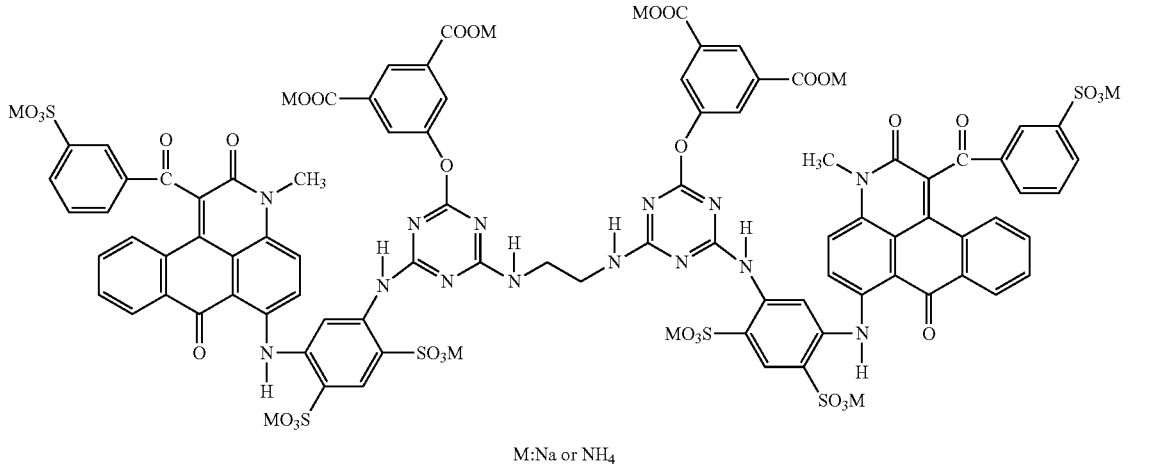

(M-1)

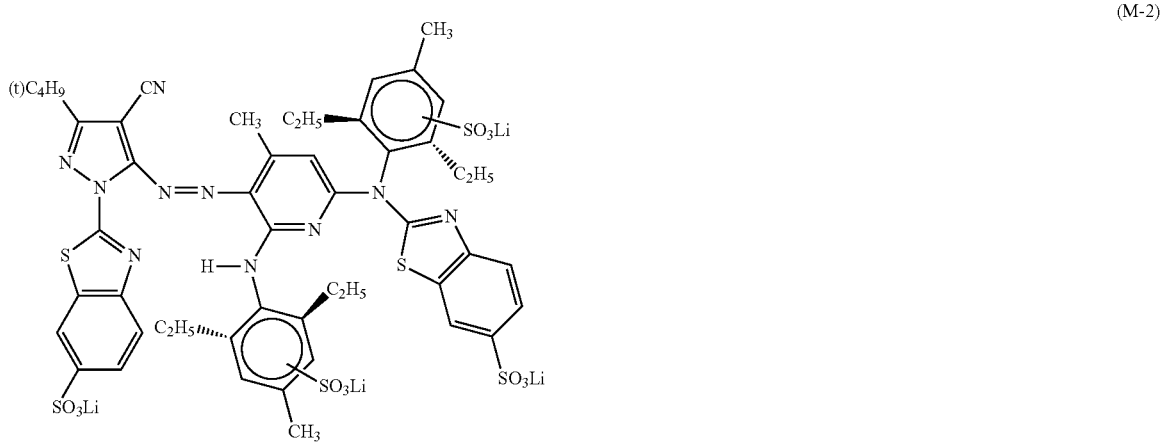

(M-2)

Examples of dyes for cyan dyes include C.I. Acid Blue 9, C.I. Direct Blue 199, a mixture of the compounds represented by the following general formula (C-1) and the following general formula (C-2), and the like, for example, and at least one of the substances above is preferably used.

The cyan dye ink may contain dyes other than the dyes mentioned above insofar as the object of the invention can be achieved.
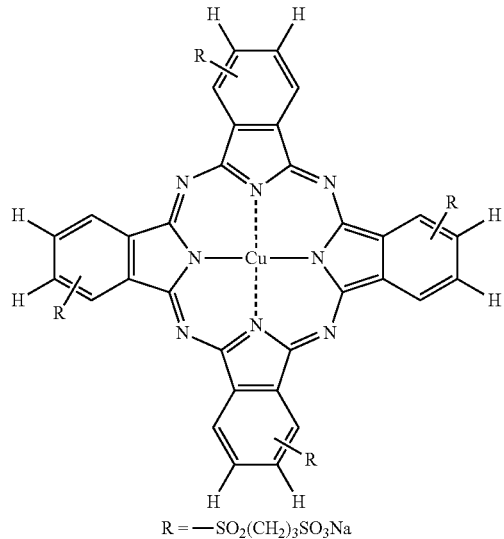
(C-1)
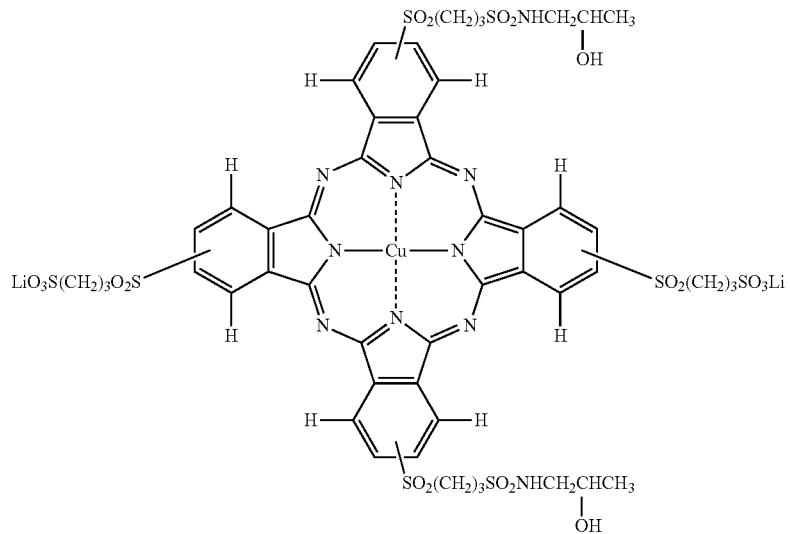
(C-2)
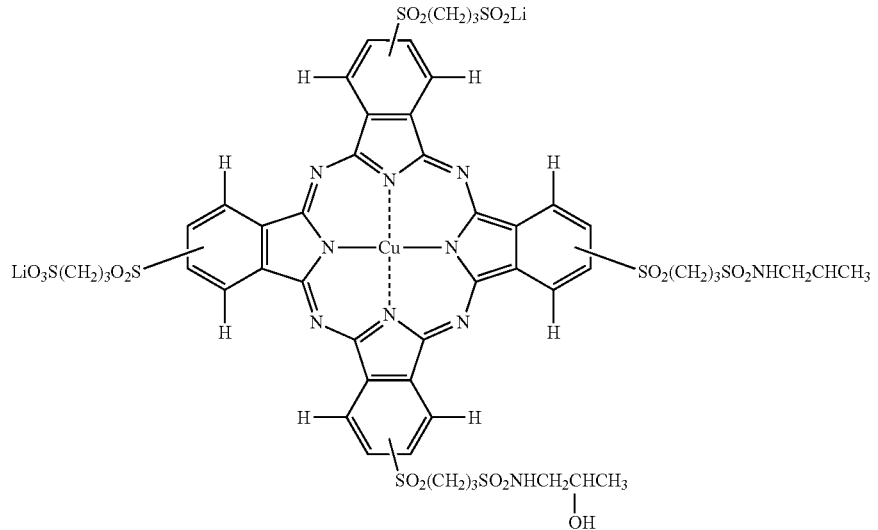
(C-3)

In the dyes (compounds) contained in dye inks, the absorbance when diluted with water by 1000 times at the maximum absorption wavelength is preferably 3.0 or more from the viewpoint of an improvement of color developability in printed matter. The absorbance is more preferably 5.7 or more and still more preferably 6.9 or more. The absorbance can be simultaneously measured in the same manner as the maximum absorption wavelength.

The content of the dye contained in the dye ink is 1.4% by mass or more and 5.0% by mass or less base on the total mass of the ink as described above. The content is preferably 1.4% by mass or more and 3.0% by mass or less and more preferably 1.4% by mass or more and 2.1% by mass or less. By setting the content of the dye within the range above, the color developability can be secured and an increase in ink viscosity and the solidification of the ink in a discharge nozzle and the like, for example, can be suppressed.

The total amount of monovalent cations contained in the dye ink is preferably 1500 or more ppm and 3500 ppm or less. The total amount is more preferably 1800 ppm or more and 3200 ppm or less and still more preferably 2100 ppm or more and 3000 ppm or less. By setting the total amount of monovalent cations within the range above, the occurrence of aggregation of pigments and the like can be further suppressed when mixed with a pigment ink. The monovalent cations contained in the dye ink are $Li^+$, $Na^+$, $K^+$, $NH_3^+$, and the like, for example, and can be measured by ion chromatography, ICP-MS (Inductively coupled plasma mass spectrometry), and the like.

Pigment

The pigment ink of this embodiment contains a self-dispersible black pigment as the pigment. The self-dispersible pigment refers to a pigment imparted with a function that the pigment is dispersible in a medium of an ink by surface treatment or the like, without using a dispersant. In the aqueous ink as in this embodiment, it is preferable to introduce functional groups (hydrophilic groups) having affinity for water into the pigment particle surface by surface treatment. Thus, the pigment can be compounded in the pigment ink as a dispersion.

Examples of the hydrophilic groups to be introduced into self-dispersible pigments include, for example, —OM, —COOM, —CO—, —$SO_3M$, —$SO_2M$, —$SO_2NH_2$, —$RSO_2M$, —$PO_3HM$, and —$PO_3M_2$, —$SO_2NHCOR$, —$NH_3$, and —$NR_3$ (M in the formulae is a hydrogen atom, alkali metal, such as Li, Na, and K, ammonium, a substituted or unsubstituted phenyl group, or an organic ammonium and R is an alkyl group having 1 or more and 12 or less carbon atoms or a substituted or unsubstituted naphthyl group), for example, and one or more of the substances is/are used.

As methods for the surface treatment, physical or chemical treatment can be adopted and the hydrophilic groups mentioned above can be bonded to the pigment particle surface. For example, examples of the physical treatment include vacuum plasma treatment and the like. Examples of the chemical treatment include a wet oxidation method including performing oxidation by an oxidizer in water, a method including bonding p-aminobenzoic acid to the pigment particle surface to bond a carboxy group through a phenyl group, and the like.

When a black pigment is used as the pigment, it is preferable to use oxidation treatment by hypohalous acid or hypophalite, oxidation treatment by ozone, oxidation treatment by persulfuric acid or persulfate. Thus, the black color developability in printed matter can be improved.

As the black pigment, carbon black manufactured by known methods, such as a contacting method, a furnace method, and a thermal method, can be adopted, for example. Examples of the carbon black include, for example No. 2300, 900, MCF88, No. 20B, No. 33, No. 40, No. 45, No. 52, MA 7, MA 8, MA 100, and No. 2200B (all manufactured by Mitsubishi Chemical Corporation), Color Black FW1, FW2, FW2V, FW18, FW200, S150, S160, and S170, Printex 30, U, V, and 140U, Special Black 6, 5, 4A, 4, and 250 (all manufactured by Evonic Degussa), Conductex SC, Raven 1255, 5750, 5250, 5000, 3500, 1255, and 700 (all manufactured by Columbian Carbon Japan Ltd.), Regal 400R, 330R, and 660R, MOGUL L, MONARCH 700, 800, 880, 900, 1000, 1100, 1300, and 1400, ELFTEX 12 (Cabot Corporation), and the like. The carbon blacks may be used alone or as a mixture of two or more kinds thereof.

Color pigment inks of colors other than the black color may be produced using pigments exhibiting colors, such as cyan, yellow, and magenta, other than the black pigments.

When the color pigment inks of colors other than the black color are used, the hydrophilic groups mentioned above are preferably bonded to the pigment particle surface through a phenyl group. Thus, the color developability in printed matter can be improved. As the surface treatment method including bonding the hydrophilic groups mentioned above through a phenyl group, known methods can be adopted and, for example, a method including bonding sulfanilic acid, p-aminobenzoic acid, 4-aminosalicylic acid, and the like to the pigment particle surface is mentioned.

As pigments for the color pigment inks of colors other than the black color, pigments such as phthalocyanine-based pigments, azo-based pigments, anthraquinone-based pigments, azomethine-based pigments, and condensed ring-based pigments, can be adopted besides pigments, such as a pigment red, a pigment violet, and a pigment blue given in the color index. Moreover, organic pigments, such as Orange No. 228 and No. 405 and Blue No. 1 and No. 404, inorganic pigments, such as titanium oxide, zinc oxide, zirconium oxide, iron oxide, ultramarine, Prussian blue, and chromium oxide, may be used.

Specifically, C.I. Pigment Red 1, 3, 5, 8, 9, 16, 17, 19, 22, 38, 57:1, 90, 112, 122, 123, 127, 146, and 184, C.I. Pigment Violet 1, 3, 5:1, 16, 19, 23, and 38, C.I. Pigment Blue 1, 2, 15 15:1, 15:2, 15:3, 15:4, and 16, C.I. Pigment Yellow 1, 3, 12, 13, 14, 17, 24, 34, 35, 37, 42, 53, 55, 74, 81, 83, 95, 97, 98, 100, 101, 104, 108, 109, 110, 117, 120, 138, 150, 153, 155, and 180, and the like are mentioned, for example.

The content of the pigment contained in the pigment ink is 4.0% by mass or more and 8.0% by mass or less based on the total mass of the ink as described above. The content is preferably 5.0% by mass or more and 7.0% by mass or less and more preferably 5.5% by mass or more and 6.5% by mass or less. By setting the content of the pigment within the range above, the color developability is improved and an increase in ink viscosity and the solidification of the ink in a discharge nozzle and the like, for example, can be suppressed.

The total amount of divalent ions contained in the pigment ink is preferably 3 ppm or more. The total amount is more preferably 5 ppm or more and still more preferably 10 ppm or more. By setting the total amount of the divalent ions as mentioned above, the color developability of the pigment ink on paper can be improved. Examples of the divalent ions contained in the pigment ink include calcium ions, magnesium ions, and the like, for example, and can be measured by ion chromatography, ICP-MS (inductively coupled plasma mass spectrometry), and the like.

Water

Water is the main medium (solvent) of the ink (aqueous ink) of this embodiment. When the ink is caused to adhere to a recording medium, and then printing is performed, water evaporates and scatters from the recording medium by drying. As the water, those in which ionic impurities are removed as much as possible such as pure water, e.g., ion exchange water, ultrafiltration water, reverse osmosis water, and distilled water, and ultrapure water, are usable, for example. When water sterilized by ultraviolet exposure, addition of hydrogen peroxide, and the like is used, the generation of mold or bacteria can be prevented when storing the ink for a long period of time. The content of the water contained in the ink is not particularly limited and is 45% by mass or more, preferably 50% by mass or more and 95% by mass or less, and still more preferably 55% by mass or more and 90% by mass or less based on the total mass of the ink, for example.

Organic Solvent

To the ink, organic solvents may be added. By adding the organic solvents, the physical properties of the ink, such as viscosity and surface tension, and behaviors, such as drying and penetration when caused to adhere to a recording medium, can be controlled. Examples of the organic solvents include 2-pyrrolidones, 1,2-alkanediols, polyhydric alcohols, glycol ethers, and the like, for example. One of the substances can be used alone or two or more kinds thereof can be used.

The 2-pyrrolidones refer to compounds having a 2-pyrrolidone skeleton. As the 2-pyrrolidones, compounds having substituents, such as N-methyl-2-pyrrolidone, N-ethyl-2-pyrrolidone, and N-vinyl-2-pyrrolidone, are used besides 2-pyrrolidone having no substituents, for example. The substituents in the 2-pyrrolidone skeleton are preferably organic groups, such as saturated or unsaturated hydrocarbon groups having 1 or more and 5 or less carbon atoms. Among the above, 2-pyrrolidone excellent in ink storage stability and an effect of suppressing the generation of an aggregate is more preferably used.

The content when adding the 2-pyrrolidones is preferably 0.9% by mass or more and 8.1% by mass or less based on the total mass of the ink. The content is more preferably 1.0% by mass or more and 8.0% by mass or less. By setting the content of the 2-pyrrolidones within the range above, an increase in ink viscosity can be suppressed and the ink discharge stability can be improved.

Example of the 1,2-alkanediols include 1,2-propanediol, 1,2-butanediol, 1,2-pentanediol, 1,2-hexanediol, 1,2-octanediol, and the like, for example. The 1,2-alkanediols are excellent in the action of improving the wettability of the ink to a recording medium to uniformly wet the same. Therefore, printed matter with reduced blurring can be produced. The content when adding the 1,2-alkanediols is preferably 1% by mass or more and 20% by mass or less based on the total mass of the ink.

Examples of the polyhydric alcohols include, for example, ethylene glycol, diethylene glycol, triethylene glycol, propylene glycol, dipropylene glycol, 1,3-propanediol, 1,3-butanediol, 1,3-pentanediol, 1,4-butanediol, 1,5-pentanediol, 1,6-hexanediol, 2,3-butanediol, 3-methyl-1,3-butanediol, 3-methyl-1,5-pentanediol, 2-methyl-1,3-propanediol, 2,2-dimethyl-1,3-propanediol, 2-methyl-2,4-pentanediol, glycerol, and the like. By adding the polyhydric alcohols to the ink, the dry and solidification of the ink in a discharge nozzle of an ink jet head can be suppressed and clogging, discharge failures, and the like of a discharge nozzle can be reduced. The content when adding the polyhydric alcohols is preferably 2% by mass or more and 20% by mass or less based on the total mass of the ink. Polyhydric alcohols which are solid at 20° C. also have the same action as that of the polyhydric alcohols of the organic solvents and may be used in the same way. Examples of the polyhydric alcohols which are solid at 20° C. include trimethylolpropane and the like, for example.

Examples of glycol ethers include alkylene glycol monoethers, alkylene glycol diethers, and the like, for example.

Examples of the alkylene glycol monoethers include, for example, ethylene glycol monomethyl ether, ethylene glycol monoethyl ether, ethylene glycol monoisopropyl ether, ethylene glycol monobutyl ether, ethylene glycol monohexyl ether, ethylene glycol monophenylether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, dipropylene glycol monoethyl ether, and the like.

Examples of the alkylene glycol diethers include, for example, ethylene glycol dimethyl ether, ethylene glycol diethylether, ethylene glycol dibutyl ether, diethylene glycol dimethyl ether, diethylene glycol diethylether, diethylene glycol methyl ethyl ether, diethylene glycol dibutyl ether, diethylene glycol butyl methyl ether, triethylene glycol dimethyl ether, triethylene glycol diethylether, triethylene glycol dibutyl ether, triethylene glycol butyl methyl ether, tetraethylene glycol dimethyl ether, tetraethylene glycol diethylether, tetraethylene glycol dibutyl ether, propylene glycol dimethyl ether, propylene glycol diethylether, dipropylene glycol dimethyl ether, dipropylene glycol diethylether, and the like.

By adding the glycol ethers to the ink, the wettability and the penetration speed to a recording medium can be adjusted, and therefore images, patterns, and the like can be vividly formed. The content when adding the glycol ethers is preferably 0.05% by mass or more and 6% by mass or less based on the total mass of the ink.

Two or more kinds of the organic solvents mentioned above may be used as a mixture. In that case, the total content of the organic solvents in the ink is 0.2% by mass or more and 30.0% by mass or less, preferably 0.4% by mass or more and 20.0% by mass or less, and more preferably 0.5% by mass or more and 15.0% by mass or less based on the total mass of the ink. By setting the total content of the organic solvents within the range above, the suppression of an increase in ink viscosity, the adjustment of behaviors (penetration and wetting and spreading) when caused to adhere to a recording medium, an improvement of discharge stability in printing, and the like are achieved.

Surfactant

To the ink, surfactants may be added. The surfactants have a function of reducing the surface tension of the ink to improve the permeability into a recording medium. Examples of the surfactants include nonionic surfactants, anionic surfactants, cationic surfactants, and amphoteric surfactants and at least one kind thereof can be adopted.

The content when adding the surfactant to the ink is 0.01% by mass or more and 3.00% by mass or less based on the total mass of the ink. The content is preferably 0.05% by mass or more and 2.00% by mass or less, more preferably 0.10% by mass or more and 1.00% by mass or less, and still more preferably 0.20% by mass or more and 0.50% by mass or less. By setting the content of the surfactant within the range above, foaming is suppressed and the discharge stability in printing is secured and the wetting and spreading (wettability) of the ink when caused to adhere to a recording medium can be improved.

As the nonionic surfactants, acetylene glycol-based surfactants, fluorine-based surfactants, silicone-based surfactants, and the like are usable. By the use of the surfactants, the wettability to a recording medium can be improved by a relatively low content of the surfactants.

Examples of the acetylene glycol-based surfactants include, but are not particularly limited to, 2,4,7,9-tetramethyl-5-decyne-4,7-diol, alkylene oxide adducts of 2,4,7,9-tetramethyl-5-decyne-4,7-diol, 2,4-dimethyl-5-decyne-4-ol, alkylene oxide adducts of 2,4-dimethyl-5-decyne-4-ol, and alkylene oxide adducts of 3,6-dimethyl-4-octyne-3,6-diol, 3,5-dimethyl-1-hexyne-3-ol, 2,4-dimethyl-5-hexyne-3-ol, and the like, for example.

As such acetylene glycol-based surfactants, commercially-available items may be used. For example, mentioned are Surfynol (Registered Trademark) 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all Trade Names, Air Products and Chemicals, Inc.), Olefin (Registered Trademark) B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all Trade Names, Nissin Chemical Industry CO., Ltd.), Acetylenol (Registered Trademark) E00, E00P, E40, and E100 (all Trade Names, Kawaken Fine Chemicals), and the like.

As the fluorine based surfactants, commercially-available items can be adopted and, for example, Megafac (Registered Trademark) F-479 (Trade Name, DIC CORPORATION), BYK-340 (Trade Name, BYK), and the like are mentioned.

The silicone-based surfactants are not particularly limited and polysiloxane-based compounds can be adopted. Examples of the polysiloxane compounds include, but are not particularly limited to, polyether-modified organosiloxane, for example. Examples of commercially-available items of the polyether-modified organosiloxane include, for example, BYK-302, 306, 307, 333, 341, 345, 346, 347, and 348 (all Trade Names, BYK), KF-351A, 352A, 353, 354L, 355A, 615A, 945, 640, 642, 643, 6020, 6011, 6012, 6015, 6017, and X-22-4515 (all Trade Names, Shin-Etsu Chemical Co., Ltd.), and the like.

Examples of the anionic surfactants include, for example, a higher fatty acid salt, a soap, an α-sulfofatty acid methyl ester salt, alkyl benzenesulfonate, an alkyl sulfuric acid ester salt, an alkyl ether sulfuric acid ester salt, a monoalkyl phosphoric acid ester salt, α-olefin sulfonate, alkylnaphthalene sulfonate, naphthalene sulfonate, alkanesulfonate, polyoxyethylene alkyl ether sulfate, sulfosuccinate, a polyoxyalkylene glycol alkyl ether phosphoric acid ester salt, and the like.

Examples of the cationic surfactants include, for example, quaternary ammonium salt compounds, such as an alkyl trimethylammonium salt, a dialkyl dimethylammonium salt, and an alkyl dimethylbenzyl ammonium salt, and amine salt compounds, such as N-methyl bishydroxyethyl amine fatty acid ester hydrochloride.

Examples of the amphoteric surfactants include, but are not particularly limited to, amino acid compounds, such as an alkyl amino fatty acid salt.

The surfactants mentioned above may be used alone or in combination of two or more kinds thereof.

Other Components

To the ink, various additives, such as a pH adjuster, an antiseptic, an antifungal agent, an antioxidant, a chelating agent, and a fixing agent (resin particles), may be added as the other components.

Preparation of Ink

The ink of this embodiment can be prepared by mixing the components described above in an arbitrary order, and then performing filtration as necessary to remove impurities, foreign substances, and the like. As a method for mixing the components, a method including sequentially adding materials to a container provided with a stirring device, such as a mechanical stirrer or a magnetic stirrer, followed by stirring and mixing, is used. As filtration methods, centrifugal filtration, filter filtration, and the like can be adopted.

Physical Properties of Ink

The surface tension at 25° C. of the ink is preferably 10 mN/m or more and 40 mN/m or less. The surface tension is more preferably 20 mN/m or more and 40 mN/m or less and still more preferably 20 mN/m or more and 35 mN/m or less. By setting the surface tension at 25° C. within the range above, the discharge stability of the ink from a discharge nozzle is improved when performing printing. Moreover, a high definition image and the like can be formed on printed matter. The surface tension of the ink can be measured by partially immersing a platinum plate in the ink in a 25° C. environment using an automatic surface tensiometer CBVP-Z (Kyowa Interface Science Co., LTD.), for example.

From the same viewpoint as the surface tension, the viscosity at 20° C. of the ink is preferably 2 mPa·s (milli Pascal second) or more and 15 mPa·s or less. The viscosity is more preferably 2 mPa·s or more and 10 mPa·s or less and still more preferably 3 mPa·s or more and 6 mPa·s or less. The ink viscosity can be measured using a viscoelasticity tester MCR-300 (Pysica), for example. Specifically, the viscosity is measured by adjusting the temperature of the ink to 20° C., increasing the Shear Rate to 1000 from 10, and then reading the viscosity when the Shear Rate is 200.

As an ink set of this embodiment, one or more kinds of the dye inks and one or more kinds of the pigment inks containing the black pigment ink among the inks mentioned above are stored in separate ink containers, and the inks are combined to be used as an ink set.

Ink Jet Recording Apparatus

Next, an ink jet recording apparatus according to this embodiment is described with reference to FIGURE. The ink jet recording apparatus is an apparatus which causes ink liquid droplets to adhere to a recording medium or the like to perform printing. FIGURE is a schematic perspective view illustrating the ink jet recording apparatus according to this embodiment. In this embodiment, the ink jet recording apparatus is described taking an on-carriage type printer in which an ink cartridge as an ink container is mounted in a carriage as an example. In FIGURE, the scales of members are differentiated from the actual scales thereof so that the members are recognizable.

A printer 1 as the ink jet recording apparatus is one referred to as a serial printer. The serial printer refers to a printer in which an ink jet head (hereinafter sometimes also simply referred to as "head") is mounted on a carriage moving in a predetermined direction and which performs printing while the head is moving with the movement of the carriage.

The printer 1 has a head 3, a carriage 4, a main scanning mechanism 5, a platen roller 6, and a control unit (not illustrated) which controls the entire operation of the printer 1 as illustrated in FIGURE. The carriage 4 carries the head 3. Ink cartridges 7a, 7b, 7c, and 7d each storing an ink to be supplied to the head 3 are attachable/detachable to/from the carriage 4.

The main scanning mechanism 5 has a timing belt 8 connected to the carriage 4, a motor 9 driving the timing belt 8, and a guide shaft 10. The guide shaft 10 is disposed in the scanning direction (main scanning direction) of the carriage 4 as a support member of the carriage 4. The carriage 4 is driven by the motor 9 through the timing belt 8 to be movable back and forth along the guide shaft 10. Thus, the main scanning mechanism 5 has a function of moving the carriage 4 back and forth in the main scanning direction.

The platen roller 6 has a function of transporting a recording media 2, such as paper, which is subjected to printing, in a subscanning direction (longitudinal direction of the recording medium 2) orthogonal to the main scanning direction. Therefore, the recording medium 2 is transported in the subscanning direction. The carriage 4 on which the head 3 is mounted is movable back and forth in the main scanning direction substantially in agreement with the width direction of the recording medium 2 and the head 3 can relatively scans the recording medium 2 in the main scanning direction and the subscanning direction.

The ink cartridges 7a, 7b, 7c, and 7d are independent four ink cartridges (ink containers). In the ink cartridges 7a, 7b, 7c, and 7d, the inks described above, such as black, cyan, magenta, and yellow inks, are individually stored and the inks are combined to configure an ink set. The arrangement of the inks in the ink cartridges 7a, 7b, 7c, and 7d is not particularly limited and, for example, a black pigment ink, a cyan dye ink, a magenta dye ink, and a yellow dye ink may be stored in order from the ink cartridge 7a to the ink cartridge 7d. In FIGURE, the number of the ink cartridges is four but is not limited thereto. In bottom portions of the ink cartridges 7a, 7b, 7c, and 7d, a supply port (not illustrated) for supplying the ink stored in each ink cartridge to the head 3 is provided.

For the ink cartridges 7a, 7b, 7c, and 7d, forming materials hardly causing the evaporation of moisture or the deterioration of the inks are preferably used. In this embodiment, the ink cartridges 7a, 7b, 7c, and 7d are mentioned as an example as the containers but are not limited thereto. As the container (ink container) storing the ink, an ink pack, an ink bottle, and the like may be used besides the ink cartridge.

The head 3 has a nozzle surface (not illustrated) on the surface facing the recording medium 2. On the nozzle surface, a polymer film containing a fluorine compound and a silicone compound or an eutectic plating film containing nickel and a fluorine compound may be formed as an ink repellent film. On the nozzle surface, a nozzle array (not illustrated) containing a plurality of discharge nozzles (not illustrated) is individually disposed corresponding to each color ink. The color inks are individually supplied to the head 3 from the ink cartridges 7a, 7b, 7c, and 7d to be discharged as ink liquid droplets from the discharge nozzles corresponding to the colors by an actuator (not illustrated) in the head 3. The discharged liquid droplets are caused to adhere to the recording medium 2, so that images, colors, characters, patterns, and the like are printed on the recording medium 2.

A wiper 11 is provided in one end portion in the main scanning direction of the carriage 4. The wiper 11 is a plate-like member of a substantially rectangular shape, for example, and resin having elasticity and flexibility and the like are used as forming materials. The wiper 11 has a function of wiping off the inks adhering to the nozzle surface when cleaning the discharge nozzles (head cleaning). Specifically, the carriage 4 is moved in the main scanning direction in a state where the wiper 11 abuts on the nozzle surface, and then the wiper 11 is caused to slide to the nozzle surface. The ink adhering to the nozzle surface is eliminated from the nozzle surface by such a wiping operation. When the ink adheres to the nozzle surface, color mixture (color which is not intended is printed) in printed matter or discharge failures of the discharge nozzles occur in some cases.

When the dye ink and the pigment ink which are likely to generate an aggregate have been used as an ink set in the head cleaning (wiping operation), the dye ink and the pigment ink have been mixed, so that an aggregate has been generated on the wiper 11 or the nozzle surface in some cases. When the aggregate has been generated on the wiper 11, the aggregate has adhered to the nozzle surface from the wiper 11 in the next wiping operation in some cases. When the aggregate has adhered to the discharge nozzle of the nozzle surface, problems, such as the omission of ink liquid droplets (dots) and bending, have occurred, so that the discharge stability has been likely to decrease.

On the other hand, when the volume average particle diameter of the pigment ink is defined as $\Phi1$ and the volume average particle diameter of a mixed liquid obtained by mixing the dye ink and the pigment ink in equal amounts in terms of the mass ratio is defined as $\Phi2$, the ink set of this embodiment satisfies the following expression (1), $$1.00 \leq \Phi2/\Phi1 \leq 1.40 \tag{1}$$

Thus, the volume average particle diameter $\Phi2$ of the mixed liquid is 1 times or more and 1.4 times or less the volume average particle diameter $\Phi1$ of the pigment ink. Therefore, even when the mixing of the dye ink and the pigment ink occurs on the nozzle surface, the wiper 11, and the like, an increase in the volume average particle diameter of particles of the pigment or the like is suppressed. More specifically, as compared with particles of the pigment or the like contained in the pigment ink, the generation of an aggregate in which the volume average particle diameter exceeds 1.4 times is suppressed. More specifically, an aggregate is further reduced as compared with before and, even when minute ink liquid droplets are discharged at a high speed, discharge failures are hard to occur as compared with before, so that the discharge stability can be improved.

The ratio ($\Phi2/\Phi1$) of the volume average particle diameter $\Phi1$ of the pigment ink to the volume average particle diameter $\Phi2$ of the mixed liquid is preferably 1.00 or more and 1.34 or less and more preferably 1.00 or more and 1.28 or less from the viewpoint of an improvement of the discharge stability. The ratio is still more preferably 1.10 or more and 1.25 or less. Thus, an aggregate can be further reduced.

The volume average particle diameter $\Phi1$ of the pigment ink in this specification indicates the volume standard particle size distribution (50%). As a method for measuring the volume average particle diameter, the volume average particle diameter can be determined by the dynamic light scattering method or the laser diffraction light method described in JIS Z8825. For example, a particle diameter measuring instrument ELSZ-1000 (Otsuka Electronics Co., Ltd.) can be adopted. With respect to the volume average particle diameter $\Phi2$ of the mixed liquid obtained by mixing the dye ink and the pigment ink in equal amounts in terms of the mass ratio, the dye ink and the pigment ink are mixed and stirred in equal amounts in terms of the mass ratio in a container, such as a glass tube bottle, in a 25° C. environment to form a mixed liquid, the mixed liquid is transferred to a silica glass cell, and then the volume average particle diameter $\Phi2$ can be measured using the above-described instrument in the same manner as the volume average particle diameter $\Phi1$ of the pigment ink, for example. The time until the volume average particle diameter $\Phi2$ of the mixed liquid is measured after the dye ink and the pigment ink are formed into the mixed liquid is set to 1 minute or more and 60 minutes or less, for example.

In the head 3, a piezoelectric element is used as an actuator (drive unit) but the head 3 is not limited to the mode. For example, an electromechanical conversion element displacing a diaphragm as an actuator by electrostatic attraction or an electrothermal conversion element discharging an ink composition as liquid droplets by air bubbles generated by heating may be used.

In this embodiment, the on-carriage type printer 1 is mentioned as an example as the ink jet recording apparatus but is not limited thereto. For example, an off-carriage type printer in which an ink container, such as an ink cartridge, is not mounted in a carriage may be acceptable. The ink jet recording apparatus for use in the invention is not limited to the above-described serial printer described above and may be a line head printer in which a head is widely disposed with a width equal to or wider than the width of the recording medium 2 and which performs printing without the movement of a head.

The recording medium 2 is selected as appropriate according to the intended use of printed matter or the type of an ink to be used for printing. Examples of the recording medium 2 when using an aqueous ink as in this embodiment include, for example, paper, such as plain paper, e.g., electrophotographic paper having high permeability of an aqueous ink, inkjet printing paper (ink jet paper), art paper, coated paper, and cast paper, fabrics containing natural fibers or chemical fibers, and the like. When using an oil-based ink, resin films or plates of polyvinyl chloride, polyethylene, polypropylene, polyethylene terephthalate, and the like, plates of metals, such as iron, silver, copper, and aluminum, or alloys, plates of inorganic substances, such as glass and ceramics, and non-absorbing recording media, such as a resin film having a thin film containing inorganic substances including metals and the like formed on the surface, are applied.

Ink Jet Recording Method

A recording method using the ink set and the printer 1 of this embodiment is described.

The ink jet recording method of this embodiment includes a process of causing the ink jet recording ink set of this embodiment to adhere to the recording medium 2. In this process, ink droplets (ink liquid droplets) are caused to adhere to the recording medium 2 from the head 3 of the printer 1. At this time, the ink droplets are intermittently discharged at predetermined timing and with a predetermined mass, whereby the ink droplets are caused to land on and adhere to the recording medium 2, so that designs, such as desired images, characters, patterns, and colors, are printed. Thus, printed matter is produced.

In order to perform printing using the printer 1, the cleaning of the discharge nozzle described above is performed before or during the printing in some cases. In order to secure the discharge stability, it is preferable to perform the cleaning to bring the discharge nozzle into a state close to a clean state. The ink set of this embodiment suppresses the generation of even a not-so-large aggregation as compared with particles of the pigment or the like contained in the pigment ink. Therefore, the adhesion of an aggregate which causes a discharge failure to the discharge nozzle in the head cleaning is suppressed. Furthermore, the discharge stability is improved, and therefore the printing speed can be increased as compared with before and the time required for producing printed matter can be shortened.

As described above, according to the ink jet recording ink set and the ink jet recording method of this embodiment, the following effects can be obtained.

Even when the dye ink and the pigment ink are mixed, an increase in the volume average particle diameter of particles of the pigment or the like is suppressed and the discharge stability can be improved as compared with before. In detail, the volume average particle diameter $\Phi2$ of the mixed liquid of the dye ink and the pigment ink is 1 times or more and 1.4 times or less the volume average particle diameter $\Phi1$ of the pigment ink. Therefore, even when the mixing of the dye ink and the pigment ink occurs in the head cleaning or the like, an increase in the volume average particle diameter of particles of the pigment or the like is suppressed. More specifically, as compared with particles of the pigment or the like contained in the pigment ink, the generation of an aggregate in which the volume average particle diameter exceeds 1.4 times is suppressed. Therefore, an aggregate is reduced as compared with before and, even when minute ink liquid droplets are discharged at a high speed, discharge failures are hard to occur as compared with before, and thus the discharge stability can be improved.

Moreover, the generation of an aggregate is suppressed, and therefore the content of coloring materials (dye and pigment) in the ink can be increased. Therefore, the color developability of printed matter can be improved as compared with before. Thus, an ink jet recording ink set containing a dye ink and a pigment ink in which the discharge stability and the color developability are improved corresponding to a recent high speed printing and increase in definition can be provided.

Since the dye ink contains the compound represented by General Formula (1) as a magenta dye, the generation of an aggregate is further suppressed even when mixed with the pigment ink, and the color developability of printed matter is further improved. Furthermore, the ozone resistance of printed matter can be improved.

Since the black pigment ink is used as the pigment ink, the water resistance, lightfastness, and color developability of black printing in printed matter can be improved. Moreover, since the black pigment is a self-dispersion type, a dispersant becomes unnecessary in the black pigment ink. Therefore, the generation of an aggregate, an increase in the ink viscosity, and the like originating from a dispersant can be suppressed.

Since the process of causing the ink set of the embodiment to adhere to the recording medium 2 is provided, high speed printing is enabled, and therefore the time required for producing printed matter can be shortened. Moreover, since the discharge stability is improved, the process of causing the ink to adhere to the recording medium 2 can be stably performed. Therefore, an ink jet recording method capable of stably producing high definition printed matter at a high speed as compared with before can be provided.

Hereinafter, the effects of this embodiment are more specifically described with reference to Examples and Comparative Examples with respect to the ink jet recording ink set and the ink jet recording method of this embodiment. The subsequent evaluations were performed under an environment where the temperature was 25° C. and the relative humidity was 40% unless otherwise particularly specified.

Preparation of Ink

Components (materials) of an ink were compounded and stirred with the compositions given in Tables 1 and 2 to uniformly mix the components, and then filtered with a membrane filter (pore size of 1 μm) to prepare dye inks and pigment inks.

In Tables 1 and 2, the unit of the numerical value is % by mass. The column in which no numerical values are given and "-" is given means "not contained". With respect to dyes among the components in the tables, the exemplary compound (1-20) described above was used as a magenta dye A1, the above-described exemplary compound (1-27) was used as a magenta dye A2, C.I. Reactive Red 144 was used as a magenta dye B, the compound represented by General Formula (M-2) described above is used as a magenta dye C, the compound represented by General Formula (M-1) described above was used as a magenta dye D, a mixture of the compound represented by General Formula (C-1) and the compound represented by General Formula (C-2) was used as a cyan dye E, and C.I. Direct Yellow 86 was used as an yellow dye F.

As a black pigment dispersion 1, one prepared by the following method was used. 100 g of a commercially available carbon black (No. 45, Mitsubishi Chemical Corporation) and 900 g of ion exchange water were mixed, and then stirred with EIGER MOTOR MILL M250 (Eiger Japan) for 2 hours under the conditions where the bead filling factor was 70% by volume and the number of rotations was 5000 rpm. Thereafter, 1500 g of sodium hypochlorite (Available chlorine concentration of 12% by mass) was added dropwise, and then caused to react for 5 hours while being stirred with the EIGER MOTOR MILL M250. Subsequently, the stirring was performed for 8 hours while controlling the temperature to 100° C. Thereafter, the obtained slurry was filtered and washed with water, and then the pigment concentration was adjusted to 15% by mass, whereby a self-dispersible black pigment dispersion 1 was obtained.

As a black pigment dispersion 2, the black pigment dispersion 2 was prepared in the same manner as the black pigment dispersion 1, except changing the stirring time with the EIGER MOTOR MILL M250 while controlling the temperature to 100° C. to 16 hours in the method for preparing the black pigment dispersion 1 described above. In Table 2, the contents of the black pigment dispersion 1 and the black pigment dispersion 2 are indicated in terms of the pigment concentration.

As organic solvents, glycerol and triethylene glycol monobutyl ether (indicated by the abbreviation of "TEGmBE" in Tables) were used. As surfactants, Olefin (Registered Trademark) E1010 (Trade Name, Nissin Chemical Industry CO., Ltd.) and Surfynol (Registered Trademark) 104PG-50 (Trade Name, Air Products and Chemicals, Inc.) (indicated as "104PG50" in Tables), both of which are nonionic (acetylene glycol-based) surfactants, were used. Ion exchange water was added while being adjusted so that the total mass of each ink of Examples and Comparative Examples was 100.0% by mass.

TABLE 1

| | Dye ink | | | | | | | | | |
|---|---|---|---|---|---|---|---|---|---|---|
| | A1 | A2 | A3 | A4 | A5 | A6 | A7 | A8 | A9 | A10 |
| Magenta dye A1 | 1.3 | — | 2.0 | — | — | — | — | — | — | — |
| Magenta dye A2 | — | 1.4 | — | 3.0 | 4.0 | — | — | — | — | — |
| Magenta dye B | — | — | — | — | — | 2.0 | — | — | — | — |
| Magenta dye C | — | — | — | — | — | — | 4.0 | — | — | — |
| Magenta dye D | — | — | — | — | — | — | — | 5.0 | — | — |
| Cyan dye E | — | — | — | — | — | — | — | — | 2.0 | — |
| Yellow dye F | — | — | — | — | — | — | — | — | — | 2.0 |
| Glycerol | 10.0 | 10.0 | 10.0 | 10.0 | 10.0 | 10.0 | 10.0 | 10.0 | 10.0 | 10.0 |
| TEGmBE | 10.0 | 10.0 | 10.0 | 10.0 | 10.0 | 10.0 | 10.0 | 10.0 | 10.0 | 10.0 |
| E1010 | 1.0 | 1.0 | 1.0 | 1.0 | 1.0 | 1.0 | 1.0 | 1.0 | 1.0 | 1.0 |
| 104PG50 | 0.3 | 0.3 | 0.3 | 0.3 | 0.3 | 0.3 | 0.3 | 0.3 | 0.3 | 0.3 |
| Ion exchange water | Balance | Balance | Balance | Balance | Balance | Balance | Balance | Balance | Balance | Balance |
| Total | 100.0 | 100.0 | 100.0 | 100.0 | 100.0 | 100.0 | 100.0 | 100.0 | 100.0 | 100.0 |

TABLE 2

| | Pigment ink | | | | | |
|---|---|---|---|---|---|---|
| | B1 | B2 | B3 | B4 | B5 | B6 |
| Black pigment dispersion 1 | 3.0 | 4.0 | 6.0 | 8.0 | 9.0 | — |
| Black pigment dispersion 2 | — | — | — | — | — | 6.0 |
| Glycerol | 10.0 | 10.0 | 10.0 | 10.0 | 10.0 | 10.0 |
| TEGmBE | 10.0 | 10.0 | 10.0 | 10.0 | 10.0 | 10.0 |
| E1010 | 1.0 | 1.0 | 1.0 | 1.0 | 1.0 | 1.0 |
| 104PG50 | 0.3 | 0.3 | 0.3 | 0.3 | 0.3 | 0.3 |
| Ion exchange water | Balance | Balance | Balance | Balance | Balance | Balance |
| Total | 100.0 | 100.0 | 100.0 | 100.0 | 100.0 | 100.0 |

Ink sets of Examples and Comparative Examples were produced as given in Table 4 using the dye ink A1 to the dye ink A10 given in Table 1 and the pigment ink B1 to the pigment ink B6 given in Table 2, and then evaluated as follows. In Examples 1 to 12, a combination of any one of the dye inks of magenta, cyan, and yellow colors and the black pigment ink is given as an example of the ink set but the ink set is not limited thereto. The ink set can be configured by selecting a dye ink and a pigment ink from color dye inks, color pigment inks, and black dye inks, and black pigment inks.

Evaluation of Dye

The dyes used for the dye inks of Examples and Comparative Examples were investigated for the maximum absorption wavelength of a dilute aqueous solution and the absorbance when diluted with water by 1000 times by the method described above. The results were given in Table 3.

TABLE 3

| | Maximum absorption wavelength [nm] | Absorbance |
|---|---|---|
| Magenta dye A1 | 533 | 3.55 |
| Magenta dye A2 | 533 | 3.55 |
| Magenta dye B | 544 | 2.15 |
| Magenta dye C | 555 | 1.70 |
| Magenta dye D | 511 | 0.65 |
| Cyan dye E | 617 | 3.59 |
| Yellow dye F | 391 | 4.52 |

As given in Table 3, the maximum absorption wavelengths of the magenta dyes A1 A2, B, C, and D were all within the range of 500 nm or more and 560 nm or less. The absorbance at the maximum absorption wavelength of a 1000 times water-diluted liquid of each of the magenta dye A1, the magenta dye A2, the cyan dye E, and the yellow dye F was 3.0 or more.

Ink Evaluation

Particle Diameter Change Rate

The volume average particle diameter $\Phi 1$ of the pigment inks and the volume average particle diameter $\Phi 2$ of the mixtures of the pigment inks and the dye inks were measured by the method described above, and the numerical values were given in Table 4. Moreover, $\Phi 2/\Phi 1$ (Particle diameter change rate) was calculated from the numerical values, and the calculated value was given in Table 4.

Discharge Stability

As an ink jet recording apparatus (printer), EW-M660FT (Trade Name, Seiko Epson Corp.) was used, an ink tank, an ink passage, and the like of the printer were washed with ion exchange water, and then the dye inks and the pigment inks configuring the ink sets of Examples and Comparative Examples were separately injected into ink tanks. Thereafter, head cleaning was performed twice. First, a nozzle check pattern was printed using Xerox-P (Plain paper, manufactured by Fuji Xerox Co., Ltd.) as the recording medium 2, and then it was confirmed that dots were normally discharged from all the discharge nozzles. Subsequently, solid printing with the dye inks and the pigment inks to the entire A4 size paper was continuously performed to 100 sheets while superimposing a printing region using Xerox-P under the printing conditions of No color correction mode and an image resolution of 600×1200 dpi (Dots Per inch). Thereafter, a nozzle check pattern was printed to observe the omission of a dot and the presence of bending. When the omission of a dot and bending occurred, head cleaning was performed, and then the head cleaning was repeated until all the discharge nozzles normally discharge dots. The number of times of the head cleaning required for all the discharge nozzles to normally discharge dots was recorded. The data was evaluated in accordance with the following criteria, and then the results were given as the discharge stability evaluation in Table 4.

A: The number of times of the head cleaning is 1 or less.
B: The number of times of the head cleaning is 2 or more and 5 or less.
C: The number of times of the head cleaning is 6 or more.

Color Developability

The OD (Optical Density) value of a sample for color developability evaluation was measured as the index of the color developability of printed matter, and then evaluated.

Production of Sample for Color Developability Evaluation

Using EW-M660FT (Trade Name, Seiko Epson Corp.) as the ink jet recording apparatus (printer), the dye inks and the pigment inks configuring the ink sets of Examples and Comparative Examples were separately injected into ink tanks, and then it was confirmed that the discharge nozzle perform normal discharge in the same manner as the evaluation of the discharge stability. Using a photo paper (Ink jet paper, Seiko Epson Corp.) as the recording medium 2, solid printing was performed using the dye inks under the printing conditions of No color correction mode and an image resolution of 600×1200 dpi (Dots Per inch). The printed matter was dried in a normal temperature and normal humidity environment for 3 hours to give a sample for dye color developability evaluation.

Subsequently, using Xerox-P as the recording medium 2, solid printing was performed using the pigment inks under the printing conditions of No color correction mode and an image resolution of 600×600 dpi. The printed matter was dried in a normal temperature and normal humidity environment for 3 hours to give a sample for pigment color developability evaluation.

Colorimetry of Sample for Color Developability Evaluation

The OD value of a region where the solid printing of each ink was performed was measured under the measurement condition of No light source filter, Light source D50, and a viewing angle of 2° using a colorimeter it (Trade Name, X-Rite), and the numerical values were given in Table 4. The numerical values were evaluated in accordance with the following criteria, and the results were given as the dye color developability evaluation and the pigment color developability evaluation in Table 4.

1. Dye (Dye ink) color developability evaluation
   A: The OD value is 1.90 or more.
   B: The OD value is 1.70 or more and less than 1.90.
   C: The OD value is less than 1.70.
2. Pigment (Pigment ink) color developability evaluation
   A: The OD value is 1.40 or more.
   B: The OD value is 1.20 or more and less than 1.40.
   C: The OD value is less than 1.20.

Ozone Resistance

Using the sample for dye color developability evaluation, the initial OD of the evaluation sample was measured, and then the evaluation sample was exposed to an atmosphere of 23° C., a relative humidity of 50%, and an ozone concentration of 5 ppm. A process of taking out the evaluation sample at every certain period of time, measuring the OD value, and then exposing the sample to the atmosphere again was repeated, whereby the OD value change rate of the evaluation sample was measured. The evaluation was performed in accordance with the following criteria, and then the results were given as the ozone resistance evaluation in Table 4. The OD value change rate (%) was calculated using the following expression (a).

$$\text{OD value change rate (\%)}=(1-\text{OD value after exposure/Initial OD value})\times 100 \qquad (a)$$

S: The OD value change rate after the total ozone exposure time of 16 hours was less than 30%.

A: The OD value change rate after the total ozone exposure time of 10 hours was less than 30% but the OD value change rate after the total ozone exposure time of 16 hours was 30% or more.

B: The OD value change rate after the total ozone exposure time of 10 hours was 30% or more.

TABLE 4

|  |  | Example 1 | Example 2 | Example 3 | Example 4 | Example 5 | Example 6 | Example 7 | Example 8 |
|---|---|---|---|---|---|---|---|---|---|
| Ink set | Dye ink | A2 | A3 | A4 | A6 | A7 | A8 | A9 | A10 |
|  | Dye content [% by mass] | 1.4 | 2.0 | 3.0 | 2.0 | 4.0 | 5.0 | 2.0 | 2.0 |
|  | Pigment ink | B3 | B3 | B3 | B3 | B3 | B3 | B3 | B3 |
|  | Pigment content [% by mass] | 6.0 | 6.0 | 6.0 | 6.0 | 6.0 | 6.0 | 6.0 | 6.0 |
| Particle diameter | Volume average particle diameter $\Phi1$ [nm] | 260 | 260 | 260 | 260 | 260 | 260 | 260 | 260 |
|  | Volume average particle diameter $\Phi2$ [nm] | 321 | 340 | 363 | 345 | 363 | 358 | 340 | 341 |
|  | $\Phi2/\Phi1$ | 1.23 | 1.31 | 1.40 | 1.33 | 1.40 | 1.38 | 1.31 | 1.31 |
| Evaluation | <<Discharge stability evaluation>> | A | A | B | A | B | B | A | A |
|  | Dye ink OD value | 1.8 | 2 | 2.3 | 1.8 | 2 | 1.7 | 1.9 | 2 |
|  | <<Dye color developability evaluation>> | B | A | A | B | A | B | A | A |
|  | Pigment ink OD value | 1.4 | 1.4 | 1.4 | 1.4 | 1.4 | 1.4 | 1.4 | 1.4 |
|  | <<Pigment color developability evaluation>> | A | A | A | A | A | A | A | A |
|  | <<Ozone resistance evaluation>> | S | S | S | B | A | B | A | A |

|  |  | Example 9 | Example 10 | Example 11 | Example 12 | Comparative Example 1 | Comparative Example 2 | Comparative Example 3 | Comparative Example 4 |
|---|---|---|---|---|---|---|---|---|---|
| Ink set | Dye ink | A3 | A3 | A4 | A4 | A1 | A3 | A3 | A8 |
|  | Dye content [% by mass] | 2.0 | 2.0 | 3.0 | 1.4 | 1.3 | 2.0 | 2.0 | 5.5 |
|  | Pigment ink | B2 | B4 | B6 | B2 | B3 | B1 | B5 | B3 |
|  | Pigment content [% by mass] | 4.0 | 8.0 | 6.0 | 4.0 | 6.0 | 3.0 | 9.0 | 6.0 |
| Particle diameter | Volume average particle diameter $\Phi1$ [nm] | 260 | 260 | 182 | 260 | 260 | 260 | 260 | 260 |
|  | Volume average particle diameter $\Phi2$ [nm] | 342 | 361 | 252 | 274 | 325 | 338 | 372 | 383 |
|  | $\Phi2/\Phi1$ | 1.32 | 1.39 | 1.38 | 1.05 | 1.25 | 1.30 | 1.43 | 1.47 |
| Evaluation | <<Discharge stability evaluation>> | A | B | B | A | A | A | C | C |
|  | Dye ink OD value | 2 | 2 | 2.3 | 1.8 | 1.6 | 2 | 2 | 1.9 |
|  | <<Dye color developability evaluation>> | A | A | A | B | C | A | A | A |
|  | Pigment ink OD value | 1.2 | 1.7 | 1.2 | 1.2 | 1.4 | 1.1 | 1.8 | 1.4 |
|  | <<Pigment color developability evaluation>> | B | A | B | B | A | C | A | A |
|  | <<Ozone resistance evaluation>> | S | S | S | S | S | S | S | B |

As given in Table 4, in Example 1 to Example 12, the $\Phi2/\Phi1$ (Particle diameter change rate) was within the range of 1.00 or more and 1.40 or less. Therefore, the discharge stability evaluation was the B evaluation equivalent to a "Suitable" level or the A evaluation equivalent to an "Excellent" level. Thus, it is shown that the generation of an aggregate is suppressed and the discharge stability was improved in all Examples.

In the dye color developability evaluation, Example 1, Example 4, Example 6, and Example 12 were evaluated as the B evaluation equivalent to a "Suitable" level and the other Examples were evaluated as the A evaluation equivalent to an "Excellent" level. Thus, it was shown that the color developability was improved in all Examples.

In the pigment color developability evaluation, Example 9, Example 11, and Example 12 were evaluated as the B evaluation equivalent to a "Suitable" level and the other Examples were evaluated as the A evaluation equivalent to an "Excellent" level. Thus, it was shown that the color developability was improved in all Examples.

In the ozone resistance evaluation, Examples in which the magenta dye A1 and the magenta dye A2 (Example 1 to Example 3 and Example 9 to Example 12) were used as an S evaluation equivalent to a "Particularly excellent" level.

The other Examples were evaluated as the B evaluation equivalent to a "Suitable" level or the A evaluation equivalent to an "Excellent" level. Thus, it was shown that the ozone resistance of printed matter was improved by the use of the magenta dye A1 and the magenta dye A2.

On the other hand, in Comparative Example 3 and Comparative Example 4, the volume average particle diameter Φ2 of the mixed liquid increased, so that the Φ2/Φ1 exceeded 1.40. Therefore, it was found that the discharge stability evaluation was evaluated as the C evaluation equivalent to an "Unsuitable" level and it was hard to secure the discharge stability. In Comparative Example 1, the content of the magenta dye A1 was less than 1.4% by mass based on the total mass of the dye ink, and therefore it was found that the dye color developability evaluation was evaluated as the C evaluation equivalent to an "Unsuitable" level and the color developability was not improved. In Comparative Example 2, the content of the black pigment was less than 4.0% by mass based on the total mass of the pigment ink, and therefore it was found that the pigment color developability evaluation was evaluated as the C evaluation equivalent to an "Unsuitable" level and the color developability was not improved.

The entire disclosure of Japanese Patent Application No. 2017-138797, filed Jul. 18, 2017 is expressly incorporated by reference herein.

What is claimed is:

1. An ink jet recording ink set comprising:
a dye ink; and
a pigment ink, wherein
the dye ink contains a dye in a proportion of 1.4% by mass or more and 5.0% by mass or less based on a total mass of the dye ink,
the pigment ink contains a pigment in a proportion of 4.0% by mass or more and 8.0% by mass or less based on the total mass of the pigment ink, and
when a volume average particle diameter of the pigment ink is defined as Φ1 and the volume average particle diameter of a mixed liquid in which the dye ink and the pigment ink are mixed in equal amounts in terms of a mass ratio is defined as Φ2, a following expression (1) is satisfied, $$1.00 \leq \Phi2/\Phi1 \leq 1.40 \quad (1),$$ and wherein the dye is a compound having the following General Formula (1),

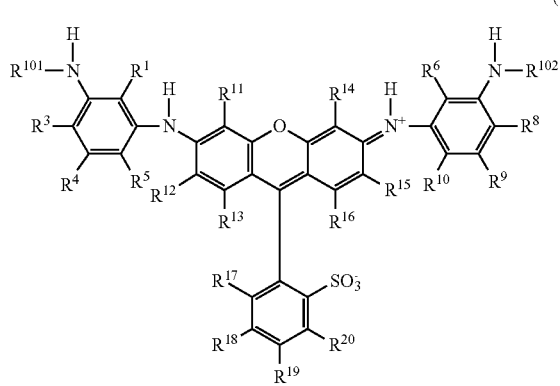

wherein, in General Formula (1), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ are each independently a hydrogen atom or a substituent, $R^{101}$ and $R^{102}$ are each independently a substituted or unsubstituted alkyl group, a substituted or unsubstituted aryl group, a substituted or unsubstituted heterocyclic group, a substituted or unsubstituted alkylsulfonyl group, a substituted or unsubstituted arylsulfonyl group, a substituted or unsubstituted alkoxycarbonyl group, a substituted or unsubstituted aryloxycarbonyl group, a carbamoyl group, a substituted or unsubstituted monoalkyl aminocarbonyl group, a substituted or unsubstituted dialkyl aminocarbonyl group, a substituted or unsubstituted monoaryl aminocarbonyl group, a substituted or unsubstituted diaryl aminocarbonyl group, or a substituted or unsubstituted alkyl aryl aminocarbonyl group.

2. The ink jet recording ink set according to claim 1, wherein
absorbance at a maximum absorption wavelength when diluted with water by 1000 times of the dye is 3.0 or more.

3. The ink jet recording ink set according to claim 2, wherein
a maximum absorption wavelength of the dye is within a range of 500 nm or more and 560 nm or less.

4. The ink jet recording ink set according to claim 1, wherein
$R^1$, $R^3$, $R^5$, $R^6$, $R^8$, and $R^{10}$ in the compound represented by General Formula (1) is each independently an alkyl group having 1 or more and 6 or less carbon atoms.

5. The ink jet recording ink set according to claim 1, wherein
the pigment ink contains a self-dispersible black pigment as the pigment.

6. An ink jet recording method comprising:
causing the ink jet recording ink set according to claim 1 to adhere to a recording medium.

7. An ink jet recording method comprising:
causing the ink jet recording ink set according to claim 2 to adhere to a recording medium.

8. An ink jet recording method comprising:
causing the ink jet recording ink set according to claim 3 to adhere to a recording medium.

9. An ink jet recording method comprising:
causing the ink jet recording ink set according to claim 4 to adhere to a recording medium.

10. An ink jet recording method comprising:
causing the ink jet recording ink set according to claim 5 to adhere to a recording medium.

* * * * *